United States Patent
Zhuk et al.

(10) Patent No.: US 12,547,782 B1
(45) Date of Patent: Feb. 10, 2026

(54) TECHNIQUES FOR IMPLEMENTING CUSTOMIZED IMAGE PRIVACY ZONES

(71) Applicant: Amazon Technologies, Inc., Seattle, WA (US)

(72) Inventors: Dmytro Zhuk, Berlin (DE); Roman Pukhtaievych, Kyiv (UA); Julie Loch, Los Angeles, CA (US); John Santhosh Kumar Mathiyas, St. Ives (GB); Amir Chernykh, Kyiv (UA); Alexander Zarichkovyi, Kyiv (UA); Oleksii Karbachevskyi, Kyiv (UA)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 18/346,030

(22) Filed: Jun. 30, 2023

(51) Int. Cl.
| | | |
|---|---|---|
| *G06F 21/84* | (2013.01) | |
| *G06F 21/62* | (2013.01) | |
| *G06T 7/73* | (2017.01) | |
| *G06V 20/40* | (2022.01) | |
| *G06V 20/52* | (2022.01) | |
| *H04N 7/18* | (2006.01) | |

(52) U.S. Cl.
CPC .......... *G06F 21/84* (2013.01); *G06F 21/6254* (2013.01); *G06T 7/73* (2017.01); *G06V 20/40* (2022.01); *G06V 20/52* (2022.01); *H04N 7/183* (2013.01); *H04N 7/188* (2013.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |

(Continued)

*Primary Examiner* — Philip J Chea
*Assistant Examiner* — James Ross Hollister
(74) *Attorney, Agent, or Firm* — Eversheds Sutherland (US) LLP

(57) ABSTRACT

This disclosure describes, in part, techniques for implementing customized privacy zones for security monitoring. In embodiments, such techniques may comprise receiving first data defining a first area associated with a privacy zone, receiving image data generated by a camera, the image data encompassing at least a portion of the first area, determining a position of an object detected within the image data, and determining, based on the first data and the position of the object, that the object is outside of the first area associated with the privacy zone, The techniques may further comprise defining a portion of image data that corresponds to the first area less a second area associated with the object detected within the image data, applying at least one obfuscation technique to the portion of image data, and sending the image data having the applied obfuscation technique to at least one second electronic device.

19 Claims, 22 Drawing Sheets

(56) References Cited

U.S. PATENT DOCUMENTS

| | | |
|---|---|---|
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,930,126 B1* | 2/2021 | Jeong .............. H04N 23/611 |
| 2015/0054949 A1* | 2/2015 | Scalisi ............ H04N 23/631 |
| | | 348/143 |
| 2015/0296188 A1* | 10/2015 | Meganathan .... G08B 13/19682 |
| | | 348/143 |
| 2016/0342845 A1* | 11/2016 | Tien-Spalding ........................ |
| | | G08B 13/19682 |
| 2021/0365674 A1* | 11/2021 | Veretennikov ........... H04N 7/18 |
| 2022/0394217 A1* | 12/2022 | Trundle ................ H04N 5/913 |
| 2023/0345100 A1* | 10/2023 | Reading ............... G06V 40/20 |
| 2025/0005924 A1* | 1/2025 | Piergiovanni ........ G06V 10/776 |

\* cited by examiner

TECHNIQUES FOR IMPLEMENTING CUSTOMIZED IMAGE PRIVACY ZONES

BACKGROUND

A user may place one or more security cameras around the user's property in order to monitor for objects, such as people. For example, a security camera may detect motion of a person and, in response to detecting the motion, provide a notification of that detection to the user. In many circumstances, the area being monitored by the security camera may be a set area and the user may be notified any time that there is a detected movement within that area. In some of these cases, such as when the field of view for the security camera includes an area owned or otherwise associated with other entities, privacy concerns might arise in relation to video or other imagery captured by the security camera. This might make any produced security footage difficult to share when a security event occurs.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for implementing customized privacy zones for implementation in security monitoring. For example, a user may be presented (e.g., via a graphical user interface (GUI)) an area that is capable of being monitored via a suitable electronic device. In this example, the user may provide an indication of a desired privacy zone via the GUI within which captured video should be obfuscated. The indication may then be mapped to a physical space within the area capable of being monitored by the electronic device.

In this example, image data collected by a camera in the electronic device may be processed to identify one or more objects within that image data (e.g., using one or more computer vision techniques). Upon detecting one or more objects within the image data, a determination may be made, based on a position of the object(s) whether the object(s) is inside or outside of the indicated privacy zone.

In some cases, an object is determined to be inside or outside of the indicated privacy zone based on whether a determined physical location of the object (e.g., as determined using radar data, etc.) is within a physical area associated with the privacy zone. In some cases, the object is determined to be inside or outside of the indicated privacy zone based on whether a threshold amount of a first portion of the image that corresponds to the object lies outside of a second portion of the image that corresponds to the privacy zone within the image. For example, if 20% or more of a bounding box associated with the object within the image lies outside of an area in that image defined as the privacy zone, then a determination may be made that the object lies outside of the privacy zone.

Before providing the image data to an external entity (e.g., a user device), obfuscation techniques are applied to the portion of the image data that corresponds to the indicated privacy zone. In these cases, if the object is determined to be inside of the privacy zone, then the portion of the image data that corresponds to that object would also be obfuscated. However, if the object is determined to be outside of the privacy zone, then the portion of the image data that corresponds to that object would be left unobfuscated while the remaining portion of the of the image data that corresponds to the indicated privacy zone is obfuscated.

Embodiments of the disclosure provide for a number of advantages over conventional systems. For example, embodiments of the system allow for users to selectively anonymize portions of image data so that the image data can be shared with neighbors and/or law enforcement while maintaining the privacy of individuals that are not involved in a security incident.

Figure 1:
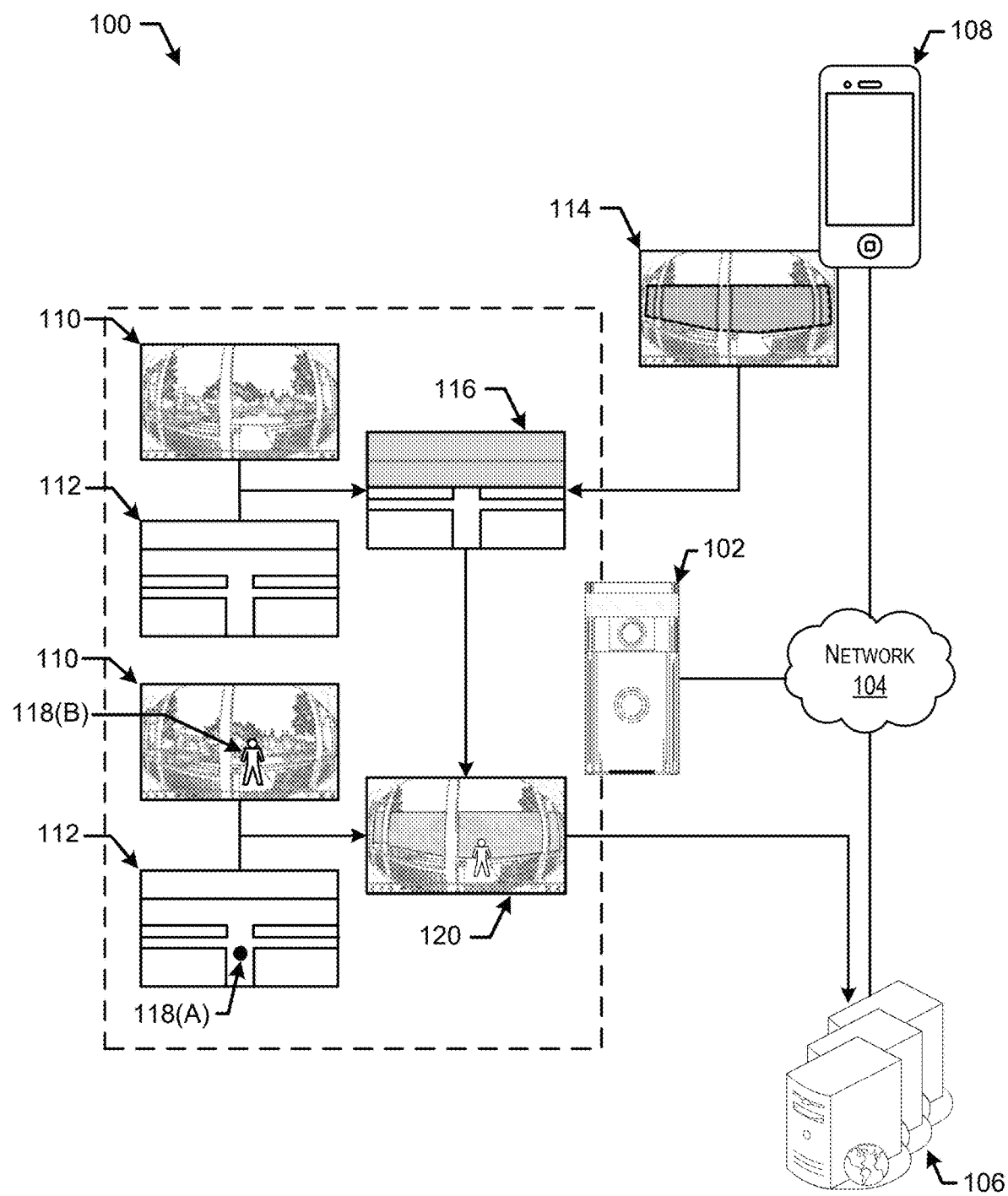
FIG. 1 depicts an example of a system in which a privacy screen may be implemented within images collected by an electronic device in accordance with at least some embodiments.

FIG. 1 depicts an example of a system in which a privacy screen may be implemented within images (e.g., video) collected by an electronic device in accordance with at least some embodiments. In the system 100, an electronic device 102 may be in communication with a network 104. In embodiments, the electronic device 102 may be in communication with one or more remote servers 106 and/or a user device 108 via the network 104.

The electronic device 102 may be any suitable device capable of performing the functions attributed to it herein. In some embodiments, the electronic device is an Audio/Video (A/V) device. Such an A/V camera device might be a video doorbell that is configured to capture images and audio in proximity to an entry for a physical location, such as a door or garage. As described in greater detail elsewhere, the electronic device 102 may include at least one camera capable of capturing image data 110 as well as a location sensor (e.g., a radar) capable of generating object location data. Additionally, the electronic device 102 may include at least one motion sensor capable of detecting the presence (e.g., movement of) an object.

In some cases, the electronic device may maintain mapping data 112 that represents a physical space in which the electronic device is located and more particularly, a relative position of various objects/geographical landmarks in relation to the electronic device 102. In some cases, such mapping data 112 may be generated by the electronic device (e.g., using a radar). In other cases, such mapping data 112 may be provided to the electronic device by the remote system 106. It should be noted that in these cases, the remote system 106 may receive the mapping data 112 from another entity (e.g., a third-party service provider).

The network 104 may include any suitable local network of devices. In some embodiments, such a network 104 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. As noted above, the network 104 may include a wireless sensor network (WSN). In embodiments, the network 104 may be configured as a low-power (LP) version of a network type, such as a LPWAN. The devices in the network 104 might operate in either synchronous or asynchronous mode.

The remote system 106 may be any suitable computing device configured to manage communications between the electronic device 102 and the user device 108 as described herein. In some embodiments, the remote system 106 may maintain account data related to one or both of such devices. In embodiments in which the remote system uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The user device 108 may include any suitable electronic device configured to interact with other electronic devices on a network. In some non-limiting examples, the user device 108 may be a variety of devices including, for example: a mobile phone, a personal data assistant (PDA), or a mobile computer (e.g., a laptop, notebook, notepad, tablet, etc.) having mobile wireless data communication capability. In some embodiments, communications between the user device 108 and one or more other electronic devices of the system 100 may be facilitated via a software application (e.g., a mobile application) that is installed upon, and executed from, the user device 108.

In embodiments, the user device 108 may be configured to receive at least image data 110 from the electronic device 102. In these embodiments, the user device 108 may further present, on a display of the user device, the received image data 110 (e.g., via a user interface). In embodiments, the user device 108 may receive user input from a user of the user device 108 in relation to the displayed image data that represents indicated boundaries for a privacy zone 114. The user device 108 may generate, from such input data, privacy zone data 114 that is then transmitted to one or more electronic device 102 or the remote system 106 via the network 104.

The devices of the system 100 may perform a number of actions to achieve the disclosed implementation. In embodiments, the electronic device 102 may maintain a mapping between image data 110 collected by a camera of the electronic device 102 and mapping data 112 that represents a physical space in which the electronic device is located. For example, the electronic device 102 may maintain a correlation between various portions of an image captured by the electronic device and specific locations within the mapping data 112. Upon receiving (e.g., from the user device 108) the privacy zone data 114, the electronic device 102 may generate privacy map data 116 that correlates one or more portions of the physical space to obfuscation techniques. In other words, the privacy map data 116 may indicate physical areas located within which detected objects should be obfuscated.

As noted above, the electronic device 102 may include a location sensor (e.g., a radar sensor) that may be used to determine locations of objects, such as a location of detected object 118 (A), within a physical area associated with the electronic device 102. The location sensor may be configured to determine a distance of the detected object 118 from the electronic device 102 as well as an angle of the object 118 in relation to a facing of the electronic device 102.

To determine the location of the object 118, the radar sensor includes at least one antenna that is configured to transmit signals and at least two antennas (which may include the at least one antenna) that are configured to receive the signals after the signals are reflected off objects. The at least one antenna may transmit the signals at a given frame rate and/or the at least two antennas may receive the signals at the given frame rate. As described herein, a frame rate for the location sensor may include, but is not limited to, 10 frames per second, 15 frames per second, 30 frames pers second, and/or any other frame rate. After receiving the reflected signals, the radar sensor may process each reflected signal in order to measure how strong the reflected signal is at given distances. To determine the location of the object 118, the electronic device 102 may determine a distance of the object 118 from the electronic device based on a magnitude of the reflected signal and the angle of the object 118 from a phase difference between the reflected signal as received at each of the two antennae.

In some examples, and since a location of object 118 is represented as polar coordinates (e.g., a distance and angle), the electronic device 102 may then convert the polar coordinates for the object 118 into cartesian coordinates. For example, the electronic device 102 may convert the distance and the angle associated with the object 118 to a first cartesian coordinate (e.g., a first distance) along a first axis (e.g., the "x-axis") relative to the electronic device 102 and a second cartesian coordinate (e.g., a second distance) along a second axis (e.g., the y-axis) relative to the electronic device 102. For example, the electronic device 102 may determine the coordinates using the following equations:

$$d \times \cos(a) = \text{first coordinate} \quad (1)$$

$$d \times \sin(a) = \text{second coordinate} \quad (2)$$

In the equations above, d may include the distance and a may include the angle for the detected object 118. Additionally, in some examples, the electronic device 102 may use the height of the electronic device 102 (e.g., as installed on a structure) when determining the cartesian coordinates. For example, a user may input the height into the user device 108. The user device 108 may then send data representing the height to the remote system(s) 106, which may then send the data to the electronic device 102. The electronic device 102 may then determine a new distance, d', using the height, h, by the following equation:

$$\sqrt{d^2 + h^2} = d' \quad (3)$$

When using the height to determine the new distance, the electronic device 102 may then use the new distance, d', in equations (1) and (2) above instead of the original distance, d, when determining the cartesian coordinates.

The electronic device 102 may also use an imaging device in order to generate image data 110. In some examples, the electronic device 102 is continuously generating the image data 110 using the imaging device. For example, the electronic device 102 may continuously provide power to the imaging device such that the imaging device is activated (e.g., turned on) and generating the image data 110 at all times. In other examples, the electronic device 102 may begin to generate the image data 110 based on detecting the occurrence of an event. As described herein, an event may include, but is not limited to, detecting an object (e.g., a dynamic object) within a threshold distance to the electronic device 102, receiving an input using an input device (e.g., receiving an input to a button), receiving a command from the remote system(s) 106 to begin generating the image data 110, and/or any other event. As described herein, a dynamic object may include any object that is moving. For example, a dynamic object may include, but is not limited to, a person, an animal, a car, and/or any other moving object.

Upon detecting the presence of the object 118 (e.g., via a signal received from a motion sensor), the electronic device may capture image data depicting an image representation 118 (B) of the object 118. For example, the electronic device 102 may capture image an image upon detecting motion of the object 118 within a threshold distance to the electronic device 102. The electronic device 102 may then analyze the image data in order to determine a portion of that image data that is representative of the object 118. For example, the electronic device 102 may use one or more computer vision techniques to identify the outer boundary of the image representation 118 (B) within the image data.

In some embodiments, the electronic device 102 may be configured to determine that the image representation 118 (B) represents a type of object. In some examples, the type of object may include a general object such as, but is not limited to, a person, a vehicle, a package, an animal, and/or any other type of object. Additionally, in some examples, the type of object may include a specific type of object. For example, the type of object may include a specific person (e.g., a parent), a specific animal (e.g., the family dog), a specific type of vehicle (e.g., a delivery truck), and/or the like.

In some embodiments, the electronic device 102 may make a determination as to whether an object depicted in the image data 110 corresponds to an object 118 (A) as detected by the radar sensor. To do this, a location of the image representation 118 (B) is compared to a location (or at least an angle) of the detected object 118 (A) in relation to the electronic device 102. If the two locations substantially match, a determination may be made that they are the same object 118.

One or more obfuscation techniques may be applied to the images captured by the camera of the electronic device 102 such that anything within a privacy zone is obfuscated and everything outside of the privacy zone remains obfuscated. As would be recognized, however, simply applying a blank obfuscation technique to an area would likely result in object being obfuscated that should not be. Accordingly, once an object has been detected by the electronic device 102, a determination may be made as to whether that object 118 is inside or outside of a privacy zone as indicated within the stored privacy map data 116. Such a determination may be made based on the location of the detected object 11 (A) in relation to the indicated privacy zones. If a determination is made that the object is located within a privacy zone, an obfuscated image 120 may be generated by applying one or more obfuscation techniques to a portion of the image corresponding to the privacy zones.

If, however, a determination is made that the object is located outside of the privacy zones, the object may need to remain obfuscated. In these cases, the boundaries of the image representation 118 (B) may be identified within the image data 110. An obfuscated image 120 may be generated by applying the obfuscation techniques to a portion of the image corresponding to the privacy zones except for the portion of the image that corresponds to the image representation 118 (B). In this way, the user is able to prevent capturing private or sensitive image data while still being able to capture images related to a potential security risk.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol. Furthermore, it should be noted that while many of the processes described herein are described as being performed by the electronic device 102, those processes might instead be performed by the remote system 106.

Figure 2:
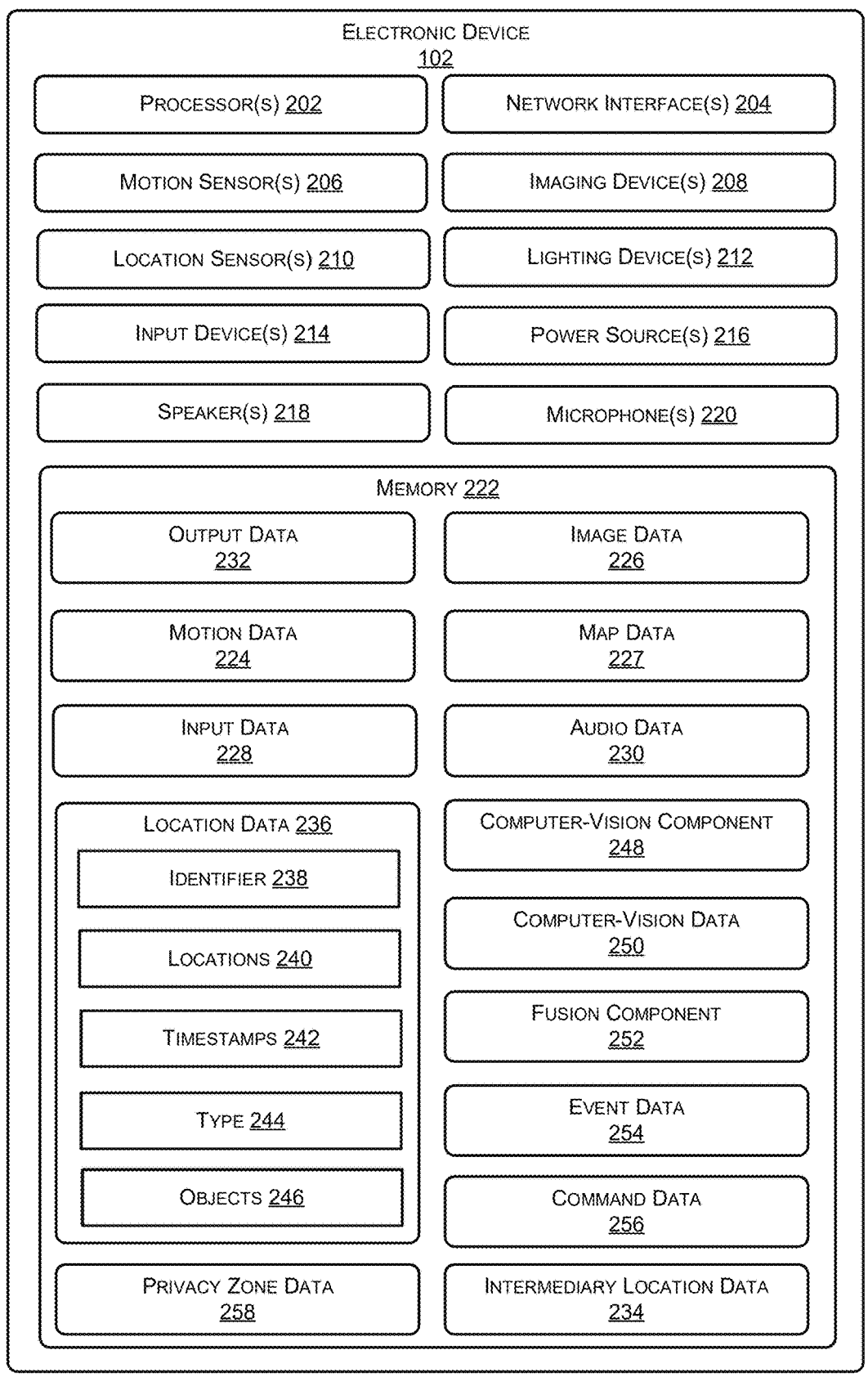
FIG. 2 illustrates an example architecture of an electronic device that may be implemented to generate obfuscated image data.

FIG. 2 illustrates an example architecture of an electronic device 102 that may be implemented to generate obfuscated image data. As shown, the electronic device 102 may include one or more processors 202, one or more network interfaces 204, one or more motion sensors 206, one or more imaging devices 208, one or more location sensors 210, one or more lighting devices 212, one or more input devices 214, one or more power sources 216, one or more speakers 218, one or more microphones 220, and memory 222.

The motion sensor(s) 206 may be any type of sensor capable of detecting and communicating the presence of an object within their field of view. As such, the motion sensor(s) 206 may include one or more (alone or in combination) different types of motion sensors. For example, in some embodiments, the motion sensor(s) 206 may comprise passive infrared (PIR) sensors, which may be secured on or within a PIR sensor holder that may reside behind a lens (e.g., a Fresnel lens). In such an example, the PIR sensors may detect IR radiation in a field of view and produce an output signal (typically a voltage) that changes as the amount of IR radiation in the field of view changes. The amount of voltage in the output signal may be compared, by the processor(s) 202, for example, to one or more threshold voltage values to determine if the amount of voltage in the output signal is indicative of motion, and/or if the amount of voltage in the output signal is indicative of motion of an object that is to be captured by the imaging device(s) 208. The processor(s) 202 may then generate motion data 224 representing the motion detected by the motion sensor(s) 206 and/or the distance to the object detected by the motion sensor(s) 206. In some examples, the processor(s) 202 may determine the distance based on the amount of voltage in the output signal. Additionally, or alternatively, in some examples, the processor(s) 202 may determine the distance based on which motion sensor 206 detected the object.

Although the above discussion of the motion sensor(s) 206 primarily relates to PIR sensors, depending on the embodiment, the motion sensor(s) 206 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 206.

An imaging device 208 may include any device that includes an image sensor, such as a camera, that is capable of generating image data 226 (which may represent, and/or include, the image data 126), representing one or more images (e.g., a video). The image sensor may include a video recording sensor and/or a camera chip. In one aspect of the present disclosure, the imager sensor may comprise a complementary metal-oxide semiconductor (CMOS) array and may be capable of recording high definition (e.g., 902$p$, 1800$p$, 4K, 8K, etc.) video files. The imaging device 208 may include a separate camera processor, or the processor(s) 202 may perform the camera processing functionality. The processor(s) 202 (and/or camera processor) may include an encoding and compression chip. In some embodiments, the processor(s) 202 (and/or the camera processor) may comprise a bridge processor. The processor(s) 202 (and/or the camera processor) may process video recorded by the image sensor and may transform this data into a form suitable for transfer by the network interface(s) 204. In various examples, the imaging device 208 also includes memory, such as volatile memory that may be used when data is being buffered or encoded by the processor(s) 202 (and/or the camera processor). For example, in certain embodiments the camera memory may comprise synchronous dynamic random-access memory (SD RAM).

The lighting device(s) 212 may be one or more light-emitting diodes capable of producing visible light when supplied with power (e.g., to enable night vision). In some embodiments, when activated, the lighting device(s) 212 illuminates a light pipe. In some examples, the electronic device 102 uses the lighting device(s) 214 to illuminate specific components of the electronic device 102, such as the input device(s) 214. This way, users are able to easily see the components when proximate to the electronic device 102.

An input device 214 may include, but is not limited to, a button, a touch-sensitive surface, a switch, a slider, and/or any other type of device that allows a user to provide input to the electronic device 102. For example, if the electronic device 102 includes a doorbell, then the input device 214 may include a doorbell button. In some examples, based on receiving an input, the processor(s) 202 may receive a signal from the input device 214 and use the signal to determine that the input device 214 received the input. Additionally, the processor(s) 202 may generate input data 228 representing the input received by the input device(s) 214. For example, the input data 228 may represent the type of input (e.g., a push to a button), a time that the input occurred, and/or the like.

The power source(s) 216 may include one or more batteries that provide power to the electronic device 102. However, in other examples, the electronic device 102 may not include the power source(s) 216. In such examples, the electronic device 102 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 218 may be any electromechanical device capable of producing sound in response to an electrical signal input. The microphone(s) 220 may be an acoustic-to-electric transducer or sensor capable of converting sound waves into audio data 230 representing the sound. The speaker(s) 218 and/or microphone(s) 220 may be coupled to an audio CODEC to enable digital audio received by user devices to be decompressed and output by the speaker(s) 218 and/or to enable audio data captured by the microphone(s) 220 to be compressed into digital audio data 230. The digital audio data 230 may be received from and sent to user devices using the remote system(s) 106. In some examples, the electronic device 102 includes the speaker(s) 218 and/or the microphone(s) 220 so that the user associated with the electronic device 102 can communicate with one or more other users located proximate to the electronic device 102. For example, the microphone(s) 220 may be used to generate audio data representing the speech of the one or more other users, which is then sent to the user device 108. Additionally, the speaker(s) 218 may be configured to output user speech of the user, where the user's user speech may also be represented by audio data 230.

The location sensor(s) 210 may include, but are not limited to, radio detection and ranging (radar) sensor(s), light detection and ranging (lidar) sensor(s), proximity sensor(s), distance sensor(s), and/or any other type of sensor that is capable of generating output data 232 representing location(s) of object(s). In some examples, such as then the location sensor(s) 210 include a radar sensor, the location sensor 210 may include one or more antennas that transmit signals and two or more antennas (which may include the one or more antennas) that receive the signals after the signals are reflected off objects. In some examples, the antennas of the location sensor may both transmit and receive the signals. At least one antenna may transmit the signals and/or at least two antennas may receive the signals at a given frame rate. As described herein, the frame rate may include, but is not limited to, 10 frames per second, 15 frames per second, 30 frames pers second, and/or any other frame rate. After receiving the reflected signals, the location sensor 210 may process each reflected signal in order to measure how strong the reflected signal is at given distances.

In some examples, the electronic device 102 may generate intermediary location data 234 representing the distances and angles. For example, the intermediary location data 234 may represent polar coordinates to objects that are detected using the location sensor(s) 210. In some examples, the electronic device 102 may then convert the distances and the angles to cartesian coordinates. For example, the electronic device 102 may convert the distance and the range associated with the first polar location to a first cartesian coordinate (e.g., a first distance) along a first axis (e.g., the "x-axis") relative to the electronic device 102 and a second cartesian coordinate (e.g., a second distance) along a second axis (e.g., the y-axis) relative to the electronic device 102. In some examples, the electronic device 102 may convert the polar coordinates using various equations.

Additionally, in some examples, such as when the location sensor(s) 210 include a lidar sensor, the location sensor 210 may include one or more lasers that emit pulsed light waves into the environment 104. These pulsed light waves may then reflect off of surrounding objects and be recorded by the location sensor 210. The location sensor 210 may then use the time that it took for each light pulse to return to the light sensor 210, along with the speed of the light pulse, to calculate the distance that the pulse traveled. Additionally, the light sensor 210 may use the angle at which each light pulse returned to the location sensor 210 in order to determine the angle to the object relative to the electronic device 102. The electronic device 102 may then perform similar processes as those described above to convert the distances and the angles to the cartesian coordinates.

As further illustrated in the example of FIG. 2, the electronic device 102 may store location data 236 (which may represent, and/or include, the mapping data 112, the location data 118 (A), and/or the privacy map data 116) generated by at least the electronic device 102, wherein the location data 236 represents at least an identifier 238 associated with an object, one or more locations 240 associated with the object, timestamps 242 for relating the locations 240 with the image data 226, a type 244 associated with the object, and a list of objects 246. In embodiments, an identifier 238 may be generated for each object that is detected by the electronic device 102 in order to provide for tracking of that object over time. In embodiments, an identifier may be any string of text that can be used to uniquely identify the detected object. Although the example of FIG. 2 illustrates the location data 236 as including the identifier 238, the locations 240, the timestamps 242, the type 244, and the list of objects 246, in other examples, the location data 236 may include additional data. Additionally, in other examples, the location data 236 may not include one or more of identifier 238, the locations 240, the timestamps 242, the type 244, or the list of objects 246.

As described herein, the identifier 238 may include, but is not limited to, a numerical identifier, an alphabetic identifier, a mixed numerical and alphabetic identifier, and/or any other type of identifier that identifies the object. Additionally, in some examples, and for a given location of the object, the location 240 may represent a first cartesian coordinate (e.g., a first distance) along a first axis (e.g., the "x-axis") relative to the electronic device 102 and a second cartesian coordinate (e.g., a second distance) along a second axis (e.g., the y-axis) relative to the electronic device 102. However, in other examples, and for a given location of the object, the location 240 may represent a distance to the object relative to the electronic device 102 and an angle to the object relative to the electronic device 102 (e.g., similar to the intermediary location data 234). Still, in some examples, and for a given location of the object, the location 240 may represent geographic coordinates (e.g., GPS coordinates). While these are just a couple of examples of locations 240 that may be represented by the location data 236, in other examples, the location data 236 may represent any other type of locations 240 that the user device 108 is able to use to display information indicating the locations of the object.

The type 244 may represent the type of object as determined using the computer-vision component 248 (described below). In some examples, each type 244 of object may be associated with a specific number, letter, and/or the like. For example, a person may be associated with type 244 "0", a vehicle may be associated with type 244 "1", an animal may be associated with type 244 "2", and/or so forth. Additionally, the list of objects 246 may indicate each of the objects represented by the image data 226 and/or detected by the location sensor(s) 210. In examples where the list of objects 246 includes more than one object, the location data 236 may include a respective identifier 238, respective locations 240, respective timestamps 242, and/or a respective type 244 for each object. This way, the electronic device 102 is able to track multiple objects, even when the objects include the same type of object. For example, each of the objects will be associated with a respective identifier 238 that the electronic device 102 uses to track the locations of the respective object.

For example, when the location sensor(s) 210 detect multiple objects, the location data 236 may include a first identifier 238 for a first object and a second identifier 238 for a second object. The location data 236 may further include at least first locations 240 that are associated with the first identifier 238 and second locations 240 that are associated with the second identifier 238. As new locations 240 are determined by the electronic device 102, the electronic device 102 is able to store the new locations 240 with respect to the correct object. For example, if the electronic device 102 detects new locations 240 for the first object, the electronic device 102 stores the new locations 240 in association with the first identifier 238 for the first object. In other words, the electronic device 102 uses the identifiers 238 to track different objects detected by the location sensor(s) 210.

The timestamps 242 associate the locations 240 of the object to the image data 226. For example, a first timestamp 242 may indicate that a first location 240 of an object is associated with a start of a video represented by the image data 226. Additionally, a second timestamp 242 may indicate that a second location 240 of the object is associated with a middle of the video. Furthermore, a third timestamp 242 may indicate that a third location 240 of the object is associated with an end of the video. In some examples, the timestamp 242 at the start of the video (e.g., the first frame of the video) is associated with a time of "0 seconds". As such, the first location 240 that is associated with the start of the video may also be associated with a time of "0 seconds". The timestamps 242 may then increase in time until the end of the video. In some examples, the timestamps 242 increase in milliseconds, seconds, and/or the like.

An example of the location data 236 may look as follows:
[{"objects": [{"id": 95, "type": 0, "x": 0.87, "y": 2.74}],
"pts": 8433}
{"objects": [{"id": 95, "type": 0, "x": 0.93, "y": 2.94}],
"pts": 8953}]

In this example, the "id" includes the identifier 238, the "type" includes the type 244, the "x" and "y" coordinates include the locations 240, and the "pts" includes the timestamp 242. As discussed above, in some examples, the location data 236 may be associated with more than one object. For examples, the location data 236 may look as follows:
[{"objects": [{"id": 95, "type": 0, "x": 0.87, "y": 2.74}],
"pts": 8433}
{"objects": [{"id": 95, "type": 0, "x": 0.93, "y": 2.94}],
"pts": 8953}
{"objects": [{"id": 102, "type": 0, "x": 1.33, "y": 3.50}],
"pts": 9553}]

As discussed above, in some examples, the location data 236 may represent locations 240 of the object before the imaging device(s) 208 began generating the image data 226. In such examples, the timestamps 242 for those locations 240 may include negative times. For example, if the location data 236 represents a location 240 of the object that was detected by the location sensor(s) 210 ten seconds before the imaging device(s) 208 began generating the image data 226 representing the object, then the timestamp 242 for the location 240 may include a time of "−10 seconds". For a second example, if the location data 236 represents a location 240 of the object that was detected by the location sensor(s) 210 five seconds before the imaging device(s) 208 began generating the image data 226 representing the object, then the timestamp 242 for the location 240 may include a time of "−5 seconds." This way, the user device 108 is able to identify which locations 240 of the object the location sensor(s) 210 detected before the imaging device(s) 208 began generating the image data 226.

In some embodiments, the electronic device 102 may include map data 227 that stores a representation of a geographical area in which the electronic device 102 is stored. Map data 227 may be an example of map data 112 described in relation to FIG. 1 above. In some cases, the map data is generated by the electronic device 102. For example, map data 112 may be generated using the location sensor 210 (e.g., a radar) to determine a location of one or more objects throughout the geographic area. In some embodiments, the map data 227 may be received from another electronic device, such as the remote servers 106 as described in relation to FIG. 1 above. In some cases, the map data 227 may be provided via a third-party (e.g., unaffiliated with the electronic device) service, such as a map provider.

In some examples, the electronic device 102 determines that the start of the video is the first frame of the video. In some examples, such as when the electronic device 102 continuously generates the image data 226 (e.g., the electronic device 102 does not turn off the imaging device(s) 208), the start of the video corresponds to the portion of the video that the imaging device(s) 208 were generating right after detecting an event. For example, the start of the video may correspond to the first frame of the video after detecting the event. In other examples, such as when the electronic device 102 does not continuously generate the image data 226 (e.g., the electronic device 102 turns off the imaging device(s) 208 until detecting an event), the start of the video corresponds to the first frame of the video that is generated by the imaging device(s) 208. In either of the examples, the electronic device 102 may determine that the start of the video (e.g., the first frame of the video) corresponds to a time of "0 seconds."

The electronic device 102 may then determine that a given portion of the location data 236 corresponds to the start of the video. In some examples, the electronic device 102 determines the given portion of the location data 236 based on the given portion of the location data 236 including locations 240 that were determined using output data 232 that was generated at a same time as the start of the video. The electronic device 102 may then determine that this given portion of the location data 236 includes a timestamp 242 of "0 seconds." In other words, the electronic device 102 relates this given portion of the location data 236 to the start of the video. Next, the electronic device 102 may determine that any portion(s) of the location data 236 that were generated before this given portion of the location data 236 occurred before the start of the video and as such, these portion(s) of the location data 236 include timestamp(s) 242 that are negative in time. Additionally, the electronic device 102 may determine that any portion(s) of the location data 236 that were generated after this given portion of the location data 236 occurred after the start of the video and as such, these portion(s) of the location data 236 include timestamp(s) 242 that are positive in time.

As further illustrated in the example of FIG. 2, the electronic device 102 may include the computer-vision component 248. The computer-vision component 248 may be configured to analyze the image data 226 using one or more computer-vision techniques and output computer-vision data 250 based on the analysis. The computer-vision data 250 may represent information, such as the presence of an object represented by the image data 226, the type of object represented by the image data 226, locations of the object relative to the electronic device 102, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 250 may further represent a bounding box indicating the respective location of each object represented by the image data 226.

For example, the computer-vision component 248 may analyze the image data 226 using one or more computer-vision techniques such as, but not limited to, object detection technique(s), object tracking technique(s), semantic segmentation technique(s), instance segmentation technique(s), and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 248 may use image segmentation technique(s) that use the computer-vision analysis to locate objects and boundaries (e.g., lines, curves, etc.) in images. Image segmentation may further assign labels to the segments, where segments that include the same label also include at least some of the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be used to segment the frame(s) of the video.

Clustering technique(s) may partition an image into a number of clusters (e.g., portions). For instance, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 246 may use object detection technique(s) that use computer-vision analysis to perform informative region selection, features extraction, and then classification of object(s) represented by the image data 226. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

As further illustrated in the example of FIG. 2, the electronic device 102 may store a fusion component 252. In embodiments, the fusion component 252 may be configured to analyze the location data 236 output by the location sensor(s) 210 and the computer-vision data 250 output by the computer-vision component 248 and, based on the analysis, associate each object represented by the image data 226 to respective location data 236 representing the locations of the object.

As further illustrated in the example of FIG. 2, the electronic device 102 may store event data 254. The event data 254 may represent one or more events that cause the electronic device 102 to begin generating the image data 226 using the imaging device(s) 208. For a first example, the event data 254 may represent an event indicating that the imaging device(s) 208 are to begin generating the image data 226 based on the electronic device 102 detecting, using the location sensor(s) 210 and/or the motion sensor(s) 206, an object within a threshold distance to the electronic device 102. As such, the electronic device 102 may determine, using the intermediary location data 234 and/or the location data 236, location(s) of object(s) detected by the location sensor(s) 210. The electronic device 102 may then determine if the location(s) are within the threshold distance to the electronic device 102. Based on event data 254 and based on determining that the location(s) are within the threshold distance, the electronic device 102 may detect an event.

For a second example, the event data 254 may represent an event indicating that the imaging device(s) 208 are to begin generating the image data 226 based on the electronic device 102 detecting an input using the input device(s) 214. As such, the electronic device 102 may generate input data 228 using the input device(s) 214, where the input data 228 indicates that the input device(s) 214 received an input. Based on event data 254 and based on determining that the input device(s) 214 received the input, the electronic device 102 may detect an event. While these are just a couple examples of events, in other examples, the event data 254 may represent additional and/or alternative events.

The electronic device 102 may also store command data 256. As described above, in some circumstances, a user of the user device 108 may want to receive a live view from the electronic device 102. As such, the electronic device 102 may receive the command data 256 from the remote system(s) 106, the user device 108, and/or another device. The command data 256 may represent an identifier associated with the electronic device 102, a command to generate the image data 226, a command to send the image data 226, and/or the like. In some examples, the electronic device 102 may then analyze the command data 256 and, based on the identifier, determine that the command data 256 is directed to the electronic device 102. For example, the electronic device 102 may match the identifier represented by the command data 256 to an identifier associated with, and stored by, the electronic device 102. Additionally, the electronic device 102 may cause the imaging device(s) 208 to begin generating the image data 226 (e.g., if the imaging device(s) 208 are not already generating the image data 226) and send the image data 226 to the remote system(s) 106, the user device 108, and/or another device. Additionally, if the image data 226 represents an object, the electronic device 102 may send the location data 236 associated with the object to the remote system(s) 106, the user device 108, and/or another device.

In embodiments, the electronic device 102 may further store privacy zone data 258 that indicates an area (e.g., a geographic area) that is to be obfuscated in image data. In those embodiments, such privacy zone data 258 may include an indication of one or more boundary lines for the area. Such privacy zone data 258 may be an example of privacy zone data 114 and may be received from a remote server, such as remote server 106.

In some examples, the data represented in FIG. 2 may correspond to values. For example, the output data 232 may represent magnitude values, phase different values, and/or the like. Additionally, the intermediary location data 234 may represent distance values, angle values, and/or the like. Furthermore, the locations 240 may represent first cartesian coordinate values, second cartesian coordinate values, and/or the like.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the network interface(s) may include a wide area network (WAN) component to enable message over a wide area network.

Figure 3:
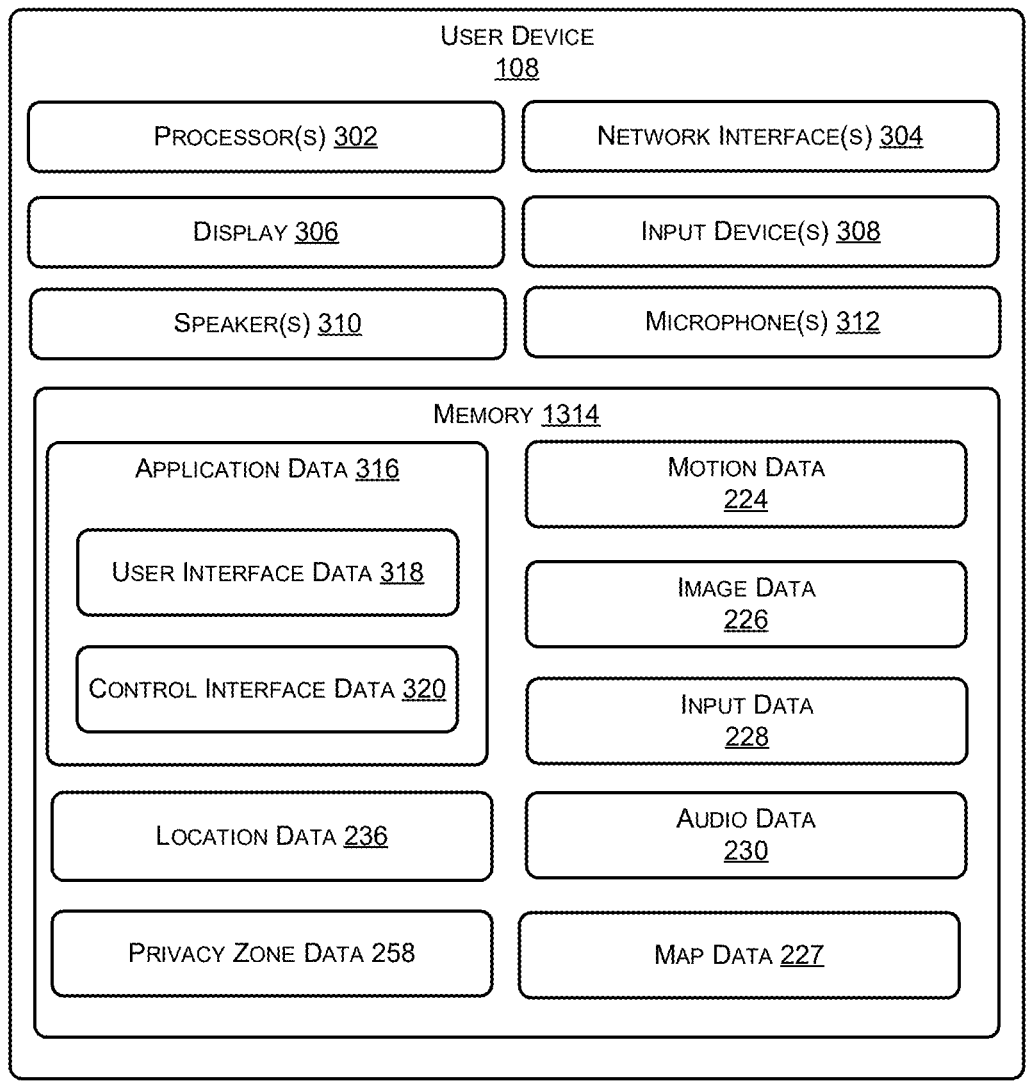
FIG. 3 depicts an example architecture of the user device, according to various examples of the present disclosure.

FIG. 3 depicts an example architecture of the user device 108, according to various examples of the present disclosure. As shown, the user device 108 may include one or more processors 302, one or more network interfaces 304, a display 306, one or more input devices 308, one or more speakers 310, one or more microphones 312, and memory 1314. In some examples, the user device 108 may include one or more additional components not illustrated in the example of FIG. 3. Additionally, in some examples, the user device 108 may not include one or more of the components illustrated in the example of FIG. 3.

As shown, the user device 108 may store application data 316. The application data 316 may represent an application that performs at least some of the processes described herein with respect to the user device 108. For instance, and as shown, the application data 316 includes user interface data 318. The user interface data 318 may represent user interface(s) that the application uses to provide the videos and/or the location information associated with an object. The application may further be configured to perform the processes described herein to analyze the location data 236 (as received from an electronic device 102) in order to determine positions for placing interface elements represented the location information. After determining the positions, the application may be configured to cause the display 306 to present the interface elements at the positions and/or present the interface elements using specific characteristics.

For instance, the application may be configured to generate control interface data 320 that causes one or more devices to perform one or more processes. For a first example, after the application determines a position on the image of the geographic area for placing an interface element, the application may be configured to generate control interface data 320 representing the position on the image for placing an interface element, characteristic(s) for the interface element, and/or the like. The application may then be configured to send, to the display 306, the control interface data 320 so that the display 306 may use the control interface data 320 to display the interface element, at the position, and using the characteristic(s). For a second example, after the application determines to update an interface element from including first characteristic(s) to including second characteristic(s), the application may be configured to generate control interface data 320 representing the second characteristic(s) for the interface element. The application may then be configured to send, to the display 306, the control interface data 320 so that the display 306 may use the control interface data 320 to update the interface element to include the second characteristic(s). In other words, the application may generate the control interface data 320 that the electronic device 102 may use to update the content being displayed by the display 306.

As further illustrated in the example of FIG. 3, the user device 108 may receive, from the remote system(s) 106, the electronic device 102, and/or another computing devices, the motion data 224, the image data 226, the input data 228, the audio data 230, the location data 236, privacy zone data 258, and/or map data 227.

In some examples, the user may use the speaker(s) 310 and/or the microphone(s) 312 in order to communicate with a person located proximate to the electronic device 102. For example, the user device 108 may receive audio data 230 generated by the electronic device 102, where the audio data 230 represents first user speech from the person. The user device 108 may then use the speaker(s) 310 to output sound represented by the audio data 230 (e.g., output sound representing the first user speech). Additionally, the user device 108 may use the microphone(s) 312 to generate audio data 230 representing second user speech from the user. The user device 108 may then send the audio data 230 to the electronic device 102 (e.g., via the remote system(s) 106). The electronic device 102 is then able to output sound represented by the audio data 230 (e.g., output sound representing the second user speech). This way, the user is able to communicate with the person.

Figure 4:
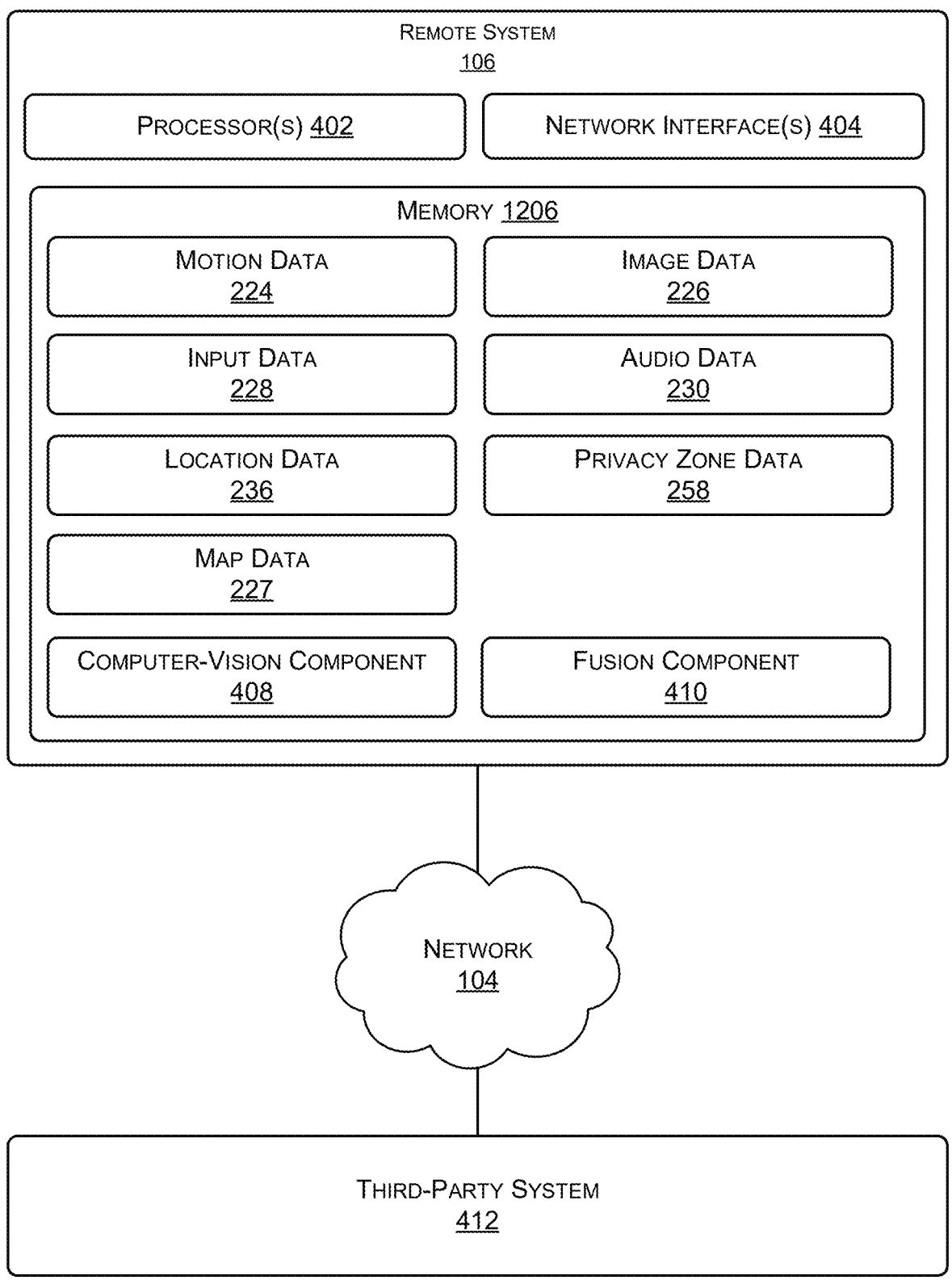
FIG. 4 illustrates an example architecture of a remote system, according to various examples of the present disclosure.

FIG. 4 illustrates an example architecture of the remote system(s) 106, according to various examples of the present disclosure. As shown, the remote system(s) 106 may include one or more processor(s) 402, one or more network interface(s) 404, and memory 1206. As further shown, the remote system(s) 106 may receive from the electronic device 102, the motion data 224, the image data 226, the input data 228, the audio data 230, and/or the location data 236. Additionally, the remote system(s) 106 may receive privacy zone data 258 from the user device 108.

The remote system(s) 106 may further store a computer-vision component 408 and a fusion component 410. In some examples, the computer-vision component 408 and/or fusion component 410 may be configured to perform similar processes as the respective computer-vision component 2488 and/or the fusion component 252 described in relation to FIG. 2 above. In other words, the remote system(s) 106 may be configured to perform at least some of the processing that is described herein with respect to the electronic device 102.

As further illustrated in the example of FIG. 4, the remote system(s) 106 may communicate with one or more third-party system(s) 412 over the network(s) 104 (as described in relation to FIG. 1 above). In some examples, the third-party system(s) 412 may be configured to provide the remote system(s) 106 and/or the user device 108 with the maps of the geographic areas described herein (e.g., map data 227). For example, the remote system(s) 106 and/or the user device 108 may send to the third-party system(s) 412, a location associated with the electronic device 102. Such a location may represent an address (e.g., the address associated with the structure on which the electronic device 102 is installed), a geographic area (e.g., the street, city, county, state, and/or the like for which the electronic device 102 is located), geographic coordinates (e.g., GPS coordinates), and/or the like. The third-party system(s) 412 may then send, to the remote system(s) 106 and/or the user device 108, map data 227 representing an image of a geographic area that includes the location.

Figure 5:
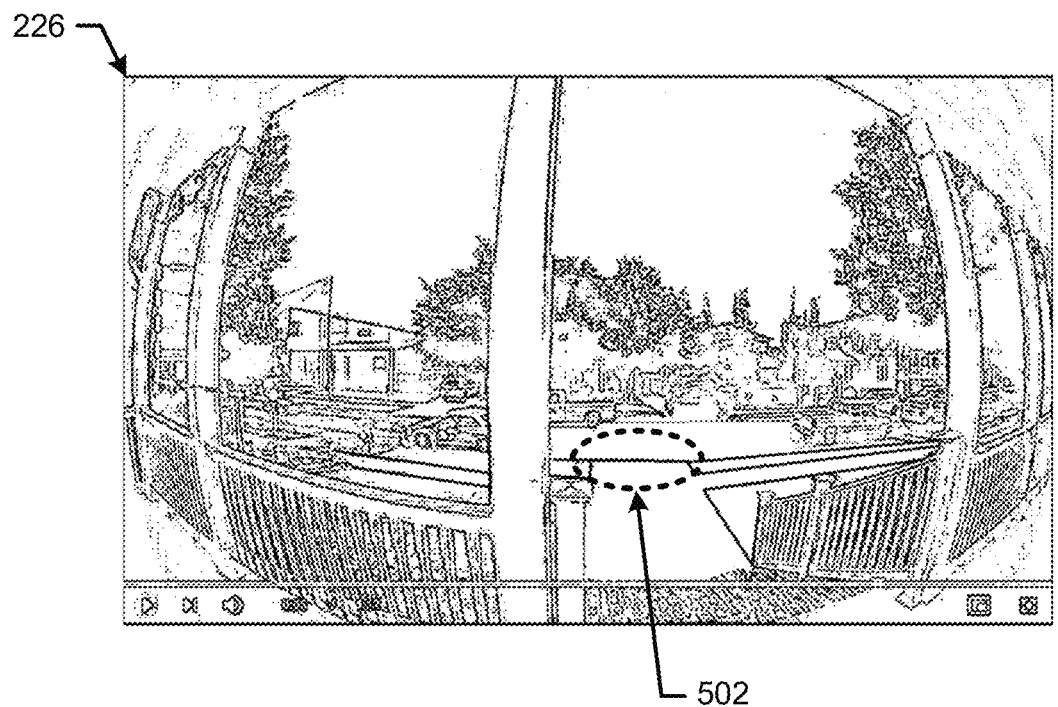
FIG. 5 depicts an exemplary relationship between image data and map data, according to various examples of the present disclosure.
Figure 5:
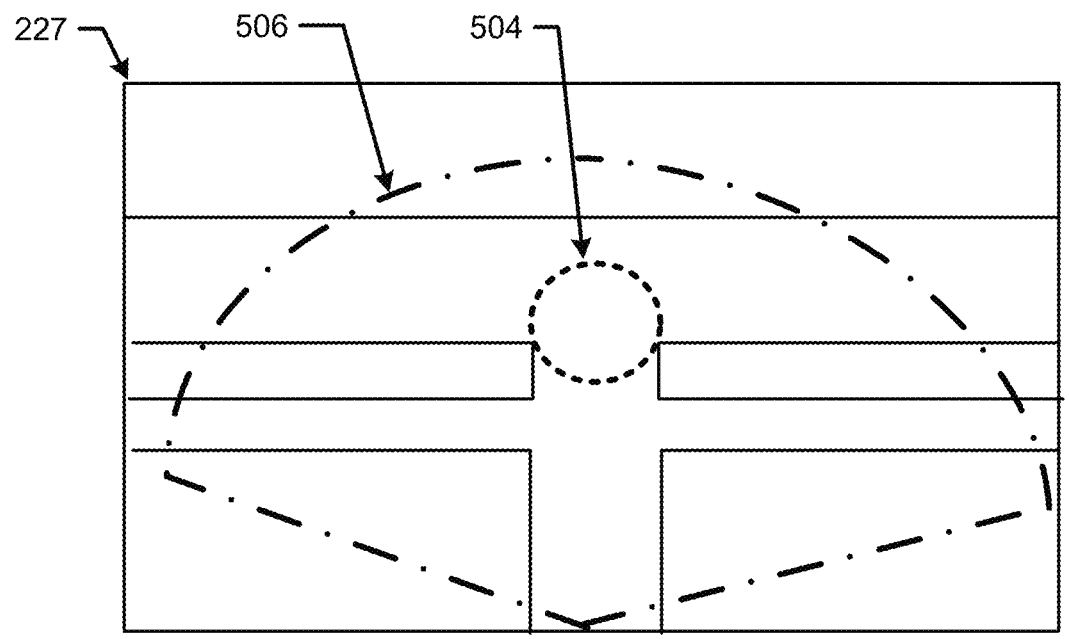

FIG. 5 depicts an exemplary relationship between image data and map data, according to various examples of the present disclosure. As noted elsewhere, an electronic device, such as an A/V device, may obtain (either continuously or periodically) image data 226 generated by a camera device installed within the electronic device. Additionally, the electronic device may maintain map data 227 that corresponds to a physical area in which the electronic device is located.

As noted elsewhere, one or more portions of the image data 226 may be mapped (or otherwise correlated) to portions of the map data 227. For example, a portion 502 of the image data 226 may be mapped to a corresponding portion 504 of the map data 227. In some cases, one or more computer vision techniques may be used to map portions of the image data 226 to the map data 227. In such cases, various portions of the image data 226 may be mapped to the map data 227 based on representations of objects and/or landmarks detected within both the image data 226 and the map data 227. For example, a depiction of a road or street within the image data 226 may be determined to correspond to a representation of a road within the map data. In another example, a portion of the image data 226 within which a particular object is detected may be correlated to a location within the map data 227 based on location data obtained from a location sensor (e.g., a radar sensor). For example, the portion of the image data 226 that depicts a tree may be correlated to a location within the map data 227 at which an object is detected that is likely to be the tree. One or more portions of the image data 226 outside of detectable landmarks may be correlated to portions of the map data 227 by virtue of a relationship (e.g., relative location) between those portions and known correlations.

In some cases, the electronic device (e.g., electronic device 102 of FIG. 1) includes a location sensor, such as a radar sensor. In such cases, the location sensor might have an effective range within which the locations of various objects can be detected. In some embodiments, information about the area covered by a location sensor may be stored along with the map data 227. For example, the map data 227 may include a bounds indicator 506 associated with the location sensor. Such a bounds indicator 506 may be made up of a plurality of lines defining a closed shape, where the closed shape is designed to generally correspond to a radar detection area. In such cases, it should be expected that the bounds indicator 506 might roughly reflect an effective range associated with the location sensors included in the electronic device. In some cases, when the map data 227 is provided to another electronic device (e.g., user device 108), that map data may include the bounds indicator 506 in order to provide an indication of what areas of the map will include object detection.

Figure 6:
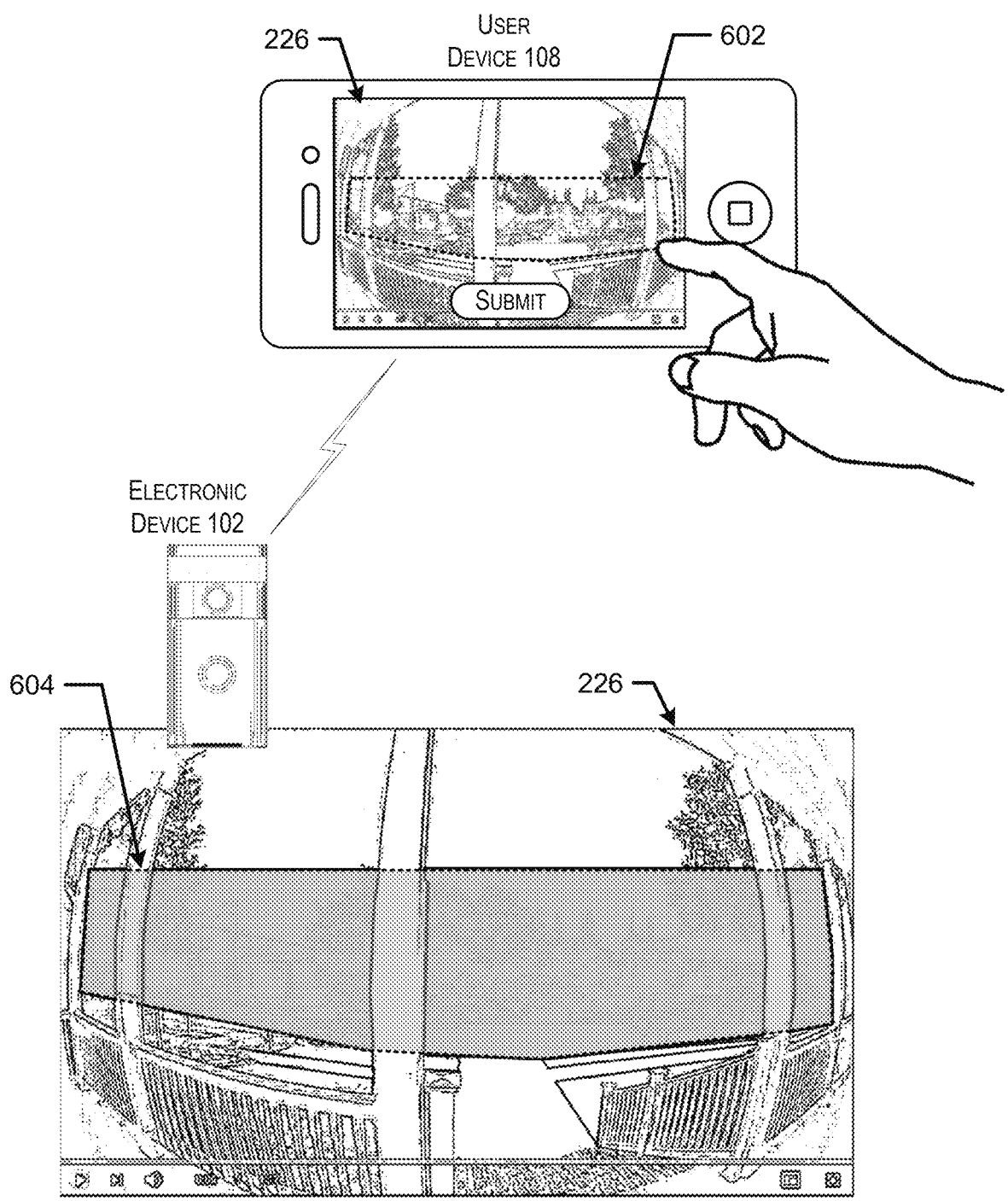
FIG. 6 depicts a first example user interface for implementing customized privacy zones for use by an electronic device, according to various examples of the present disclosure.

FIG. 6 depicts a first example user interface for implementing customized privacy zones for use by an electronic device, according to various examples of the present disclosure. Particularly, the first example is an example in which custom privacy zones may be selected by a user based on image data 226 generated by the electronic device.

In embodiments, the user device 108 (which may be an example of user device 108 as described in FIG. 1) may receive image data 226 generated by one or more cameras included within an electronic device (e.g., an A/V device) 102. In some cases, such image data 226 may be a still image collected at a single point in time. In other cases, such image data may be a continuous stream of images (e.g., a video) that may be received in real-time as it is captured or may be a pre-recorded stream of images.

As noted elsewhere, the image data may be presented on a display of the user device 108 via a graphical user interface. The graphical user interface may be associated with, and implemented upon execution of, a mobile application installed upon the user device 108. In some embodiments, the display of the user device 108 may be a touch-screen display capable of receiving input from a user of the user device 108.

A user may provide touch input to indicate the bounds 602 of a desired privacy zone to be implemented in accordance with embodiments of the disclosed system. In such cases, the user may drag his or her finger along the display of the user device 108 to indicate a number of boundaries of the desired privacy zone. The bounds 602 determined from the user input received in this manner may then be conveyed to the respective electronic device 102 and/or remote system.

Upon receiving an indication of one or more bounds 602, the electronic device 102 may implement a privacy zone 604 based on those bounds 602. As noted elsewhere, the electronic device 102 may correlate the received bounds with a physical area as represented within map data (e.g., map data 227). To implement the privacy zone 604, the electronic device 102 may apply one or more obfuscation techniques to portions of the image data 226 that fall within the bounds. As described elsewhere, while the obfuscation techniques (e.g., blurring) may be applied to the portion of the image within the privacy zone 604, such obfuscation techniques may not be applied to portions of the image that are associated with an object determined to be outside of the physical area associated with the privacy zone 604. In some cases, an object may be determined to be outside of the physical area associated with the privacy zone 604 if location data for the object (e.g., as determined based on radar data) indicates that the object is outside of the physical area. In some cases, the object may be determined to be outside of the physical area if some portion of the image that is associated with the object falls outside of the bounds 602 of the privacy zone 604 as represented in the image.

Figure 7:
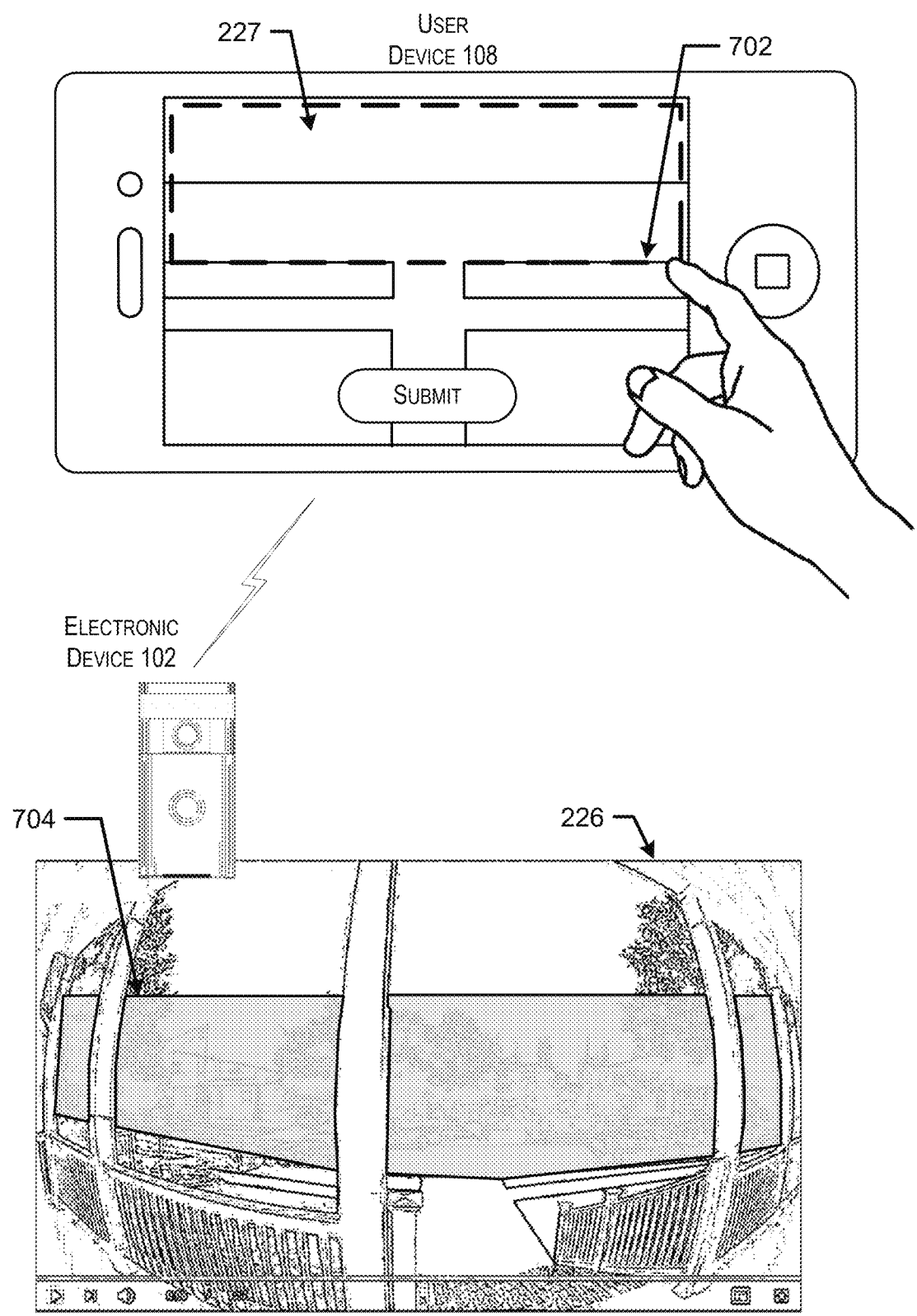
FIG. 7 depicts a second example user interface for implementing customized privacy zones for use by an electronic device, according to various examples of the present disclosure.

FIG. 7 depicts a second example user interface for implementing customized privacy zones for use by an electronic device, according to various examples of the present disclosure. Particularly, the second example is an example in which custom privacy zones may be selected by a user based on map data provided to a user device.

In embodiments, the user device 108 (which may be an example of user device 108 as described in FIG. 1) may receive map data 227 related to a physical area in which the electronic device 102 is located. In some cases, such map data 227 may be received from the electronic device 102. In other cases, such map data 227 may be received from a remote system (e.g., remote system 106 as described in relation to FIG. 1 above).

Similar to the image data 226 in FIG. 6, the map data 227 may be presented on a display of the user device 108 via a graphical user interface. The graphical user interface may be associated with, and implemented upon execution of, a mobile application installed upon the user device 108. In some embodiments, the display of the user device 108 may be a touch-screen display capable of receiving input from a user of the user device 108.

A user may provide touch input to indicate the bounds 702 of a desired privacy zone to be implemented in accordance with embodiments of the disclosed system. In such cases, the user may drag his or her finger along the display of the user device 108 to indicate a number of boundaries of the desired privacy zone corresponding to locations within the map data 227. The bounds 702 determined from the user input received in this manner may then be conveyed to the respective electronic device 102 and/or remote system.

Upon receiving an indication of one or more bounds 702, the electronic device 102 may implement a privacy zone 704 based on those bounds 702. As noted elsewhere, the electronic device 102 may correlate the received bounds with a physical area as represented by the map data 227. Additionally, the electronic device 102 may generate a privacy zone 704 by determining a portion of the image data 226 that corresponds to the selected bounds 702.

To implement the privacy zone 704, the electronic device 102 may apply one or more obfuscation techniques to portions of the image data 226 that fall within the bounds. As described elsewhere, while the obfuscation techniques may be applied to the portion of the image within the privacy zone 704, such obfuscation techniques may not be applied to portions of the image that are associated with an object determined to be outside of the physical area associated with the privacy zone 704. In some cases, an object may be determined to be outside of the physical area associated with the privacy zone 704 if location data for the object (e.g., as determined based on radar data) indicates that the object is outside of the physical area (e.g., outside of the bounds 702 as represented on map data 227). In some cases, the object may be determined to be outside of the physical area if some portion of the image that is associated with the object falls outside of the bounds 702 of the privacy zone 704 as represented in the image.

Figure 8:
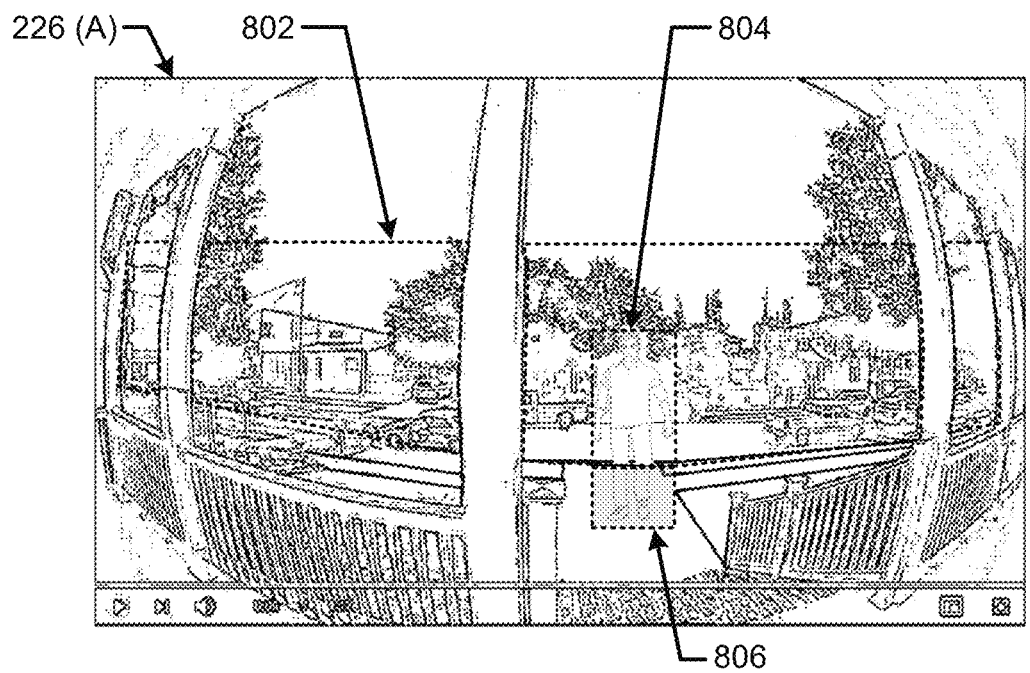
FIG. 8 depicts exemplary techniques for obfuscating a portion of an image corresponding to a privacy screen while keeping a second portion of the image corresponding to an object unobfuscated in accordance with at least some embodiments.
Figure 8:
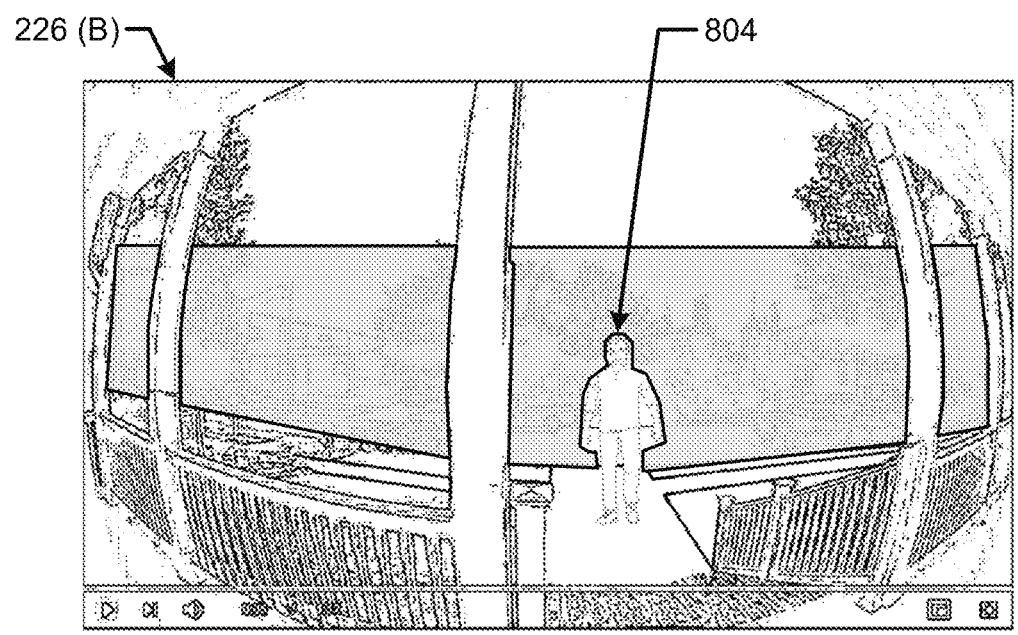

FIG. 8 depicts exemplary techniques for obfuscating a portion of an image corresponding to a privacy screen while keeping a second portion of the image corresponding to an object unobfuscated in accordance with at least some embodiments. The exemplary techniques are depicted via a graphical user interface, which may be implemented on a user device (e.g., user device 108).

As noted elsewhere, a privacy zone 802 may be generated based on user input and may be associated with a particular portion of image data 226 captured by a camera included in an electronic device. In some embodiments, the image data (A) initially captured by the camera may be analyzed before applying one or more obfuscation techniques in order to generate the obfuscated image data 226 (B).

In embodiments, one or more techniques may be used to identify a portion of the image data that represents an object 804. For example, such techniques may include the use of one or more computer vision techniques in conjunction with trained machine learning models. In accordance with one or more preferred implementations, a single shot detection approach is utilized for object detection. In accordance with one or more preferred implementations, a you-only-look-once (YOLO) approach to object detection is utilized (e.g., YOLO3). In accordance with one or more preferred implementations, upon identifying a portion of the image that corresponds to an object 804 such as a person or animal, a bounding box may be generated that represents an outer bound of that object 804. Additionally, a position may be determined for the object 804 as a set of coordinates within the image data. In some cases, the position may correspond to a center of the object 804. Upon identifying one or more objects 804, it may be highlighted or otherwise noted. In some cases, the electronic device 102 may track the movement of objects as those objects move.

In some embodiments, a determination may be made that the position of the object 804 is outside of a privacy zone 802 upon detecting that a threshold portion 806 (e.g., 20%) or amount of a bounding box surrounding the object 804 is outside of the privacy zone 802 as represented within the image data. For example, a total area within the bounding box may be determined (e.g., as a function of a height and width of the bounding box). A calculation may then be made as to an area within the bounding box that overlaps with the zone or area to calculate a portion 806 that is outside of the privacy zone 802. If the outside portion 806 is greater than a threshold percentage of the total area of the bounding box, then the object 804 is determined to have exited, or crossed out of, the privacy zone 802.

In some embodiments, a determination may be made that the position of the object 804 is outside of a privacy zone 802 upon determining that a physical location of the object 804 is outside of the privacy zone 802. For example, radar data may be used to determine a location of the object 804 within a physical area that is represented via the image data 226. The location of the object 804 within the physical area may then be compared to an area within the physical area that is associated with the privacy zone 802 as indicated in map data (e.g., map data 227). In some cases, the object 804 is determined to be outside of the area associated with the privacy zone 802 if a center of the object falls outside of the area associated with the privacy zone. In some cases, the object 804 is determined to be outside of the area associated with the privacy zone 802 if some threshold portion of the object falls outside of the area associated with the privacy zone.

As noted, the electronic device (or a remote system in some cases) may apply one or more obfuscation techniques to at least a portion of the image data 226 (e.g., the portion associated with a privacy zone 802). As noted elsewhere, where an object 804 is detected that is determined to be outside of the privacy zone 802, then the obfuscation technique will not be applied to the portion of the image data 226 corresponding to that object 804. In some cases, the obfuscation technique will not be applied to the portion of the image data 226 that includes a bounding box for the object 804.

It should be noted that a variety of different obfuscation techniques may be used in implementations of the disclosure. As would be recognized, such obfuscation techniques may involve software blurring of the image data by altering values associated with particular pixels in the image data. In some cases, the obfuscation techniques may be used to remove details from the image data (e.g., to provide some amount of anonymity) while allowing a viewer of the image data to get a general idea of what is depicted in the image. For example, an appropriate obfuscation technique may make a person in the image data unrecognizable while still allowing a viewer of the image data to determine that the person is present.

By way of non-limiting example, such obfuscation techniques may include window averaging blur (in which some of each pixel's values are replaced with an average of the values of the pixels surrounding it), window averaging with thin out blur (which is similar to window averaging but also involves duplicating pixels), color window averaging with thin out blur (similar to the previous blur technique but also involving altering the chroma plane), gauss blur (which uses weighted averaging based on pixel distance), mosaic blur (which replaces squares within the image using a value chosen with the square), mosaic color blur (similar to the previous blur technique but also involving altering the chroma plane), or resizing blur (in which the image is downsized, resulting in data loss, and then upsized). It should be noted that while the previous blurring techniques are provided, such blurring techniques are only exemplary in nature. Other suitable obfuscation techniques may be used in an equivalent manner.

In the illustrated example, raw image data 226 (A) is obtained by a camera included in an electronic device and processed to determine if the image data 226 (A) includes any object 804. If any objects 804 is detected within the image data 226 (A), then a determination is made as to whether the detected object 804 is within or outside of any maintained privacy zone 802. The obfuscation techniques are then applied to the portions of the image data 226 (A) that corresponds to the privacy zone 802 except where that image data 226 (A) includes a representation of an object determined to be outside of the privacy zone 804. In this way, obfuscated image data 226 (B) is generated, which can then be provided to a second electronic device (e.g., a user device). In some cases, the obfuscated image data 226 (B) is continuously generated (in real time) as raw image data 226 (A) is obtained from the camera (e.g., as video). As noted elsewhere, the techniques illustrated in FIG. 8 can be performed on an electronic device (e.g., an A/V device) or on a remote system. For example, an electronic device may provide raw image data 226 (A) to the remote system, which may then apply the obfuscation techniques to generate the obfuscated image data 226 (B) which can then be provided to other electronic devices.

FIG. 9 depicts techniques for implementing a privacy screen in accordance with at least some embodiments. For illustrative purposes, FIG. 9 is depicted as FIG. 9A-9D, each of which illustrate various aspects of the disclosed techniques.

Figure 9A:
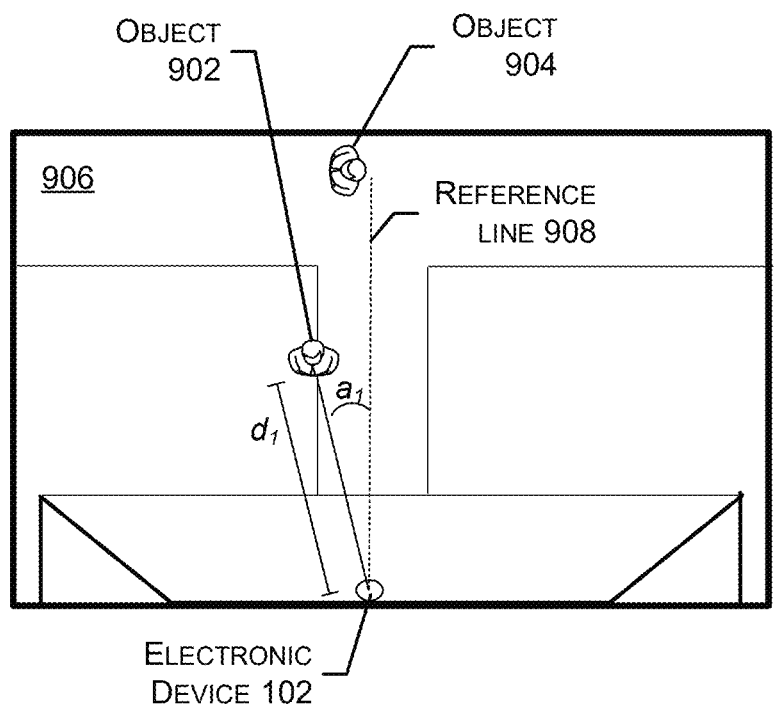
FIG. 9A illustrates techniques for determining position data for one or more objects in location data, according to various examples of the present disclosure.

FIG. 9A illustrates techniques for determining position data for one or more objects in location data, according to various examples of the present disclosure. In embodiments, position data may be determined for a number of objects detected within a physical area that includes an electronic device. For example, position data may be determined for the object 902 and/or object 904 as represented in the location representation 906. In one example, the position data may be a distance $d_1$ of the object 902 from the electronic device 102 as well as an angle $a_1$ of the object 902 from a reference line 908. In another example, the position data may be a set of coordinates representing the location of the object within a physical space.

Figure 9B:
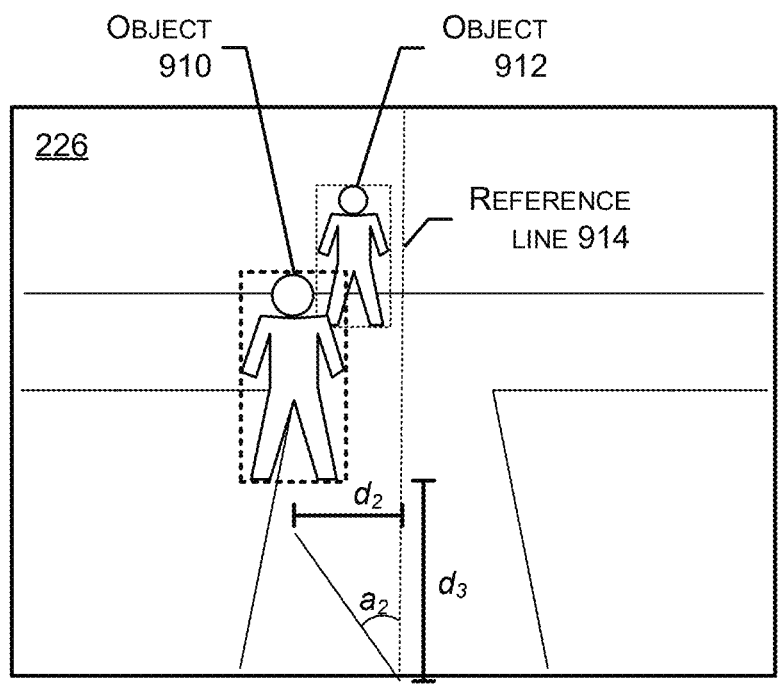
FIG. 9B illustrates techniques for determining position data for one or more objects in image data, according to various examples of the present disclosure.

FIG. 9B illustrates techniques for determining position data for one or more objects in image data, according to various examples of the present disclosure. In embodiments, position data for the object 910 and/or object 912 may be determined within image data 226 as captured by a camera included within the electronic device 102. In one example, the position data may be a distance $d_2$ of the object 910 from a reference line 914. In this example, the distance $d_2$ may include a number of pixels of the object 910 from the reference line 914 (e.g., a center line). The distance $d_2$ may then be used to identify a particular angle $a_2$ to be associated with the object 910. In some cases, an angle $a_2$ may be calculated by subjecting a value of distance $d_2$ to an angular mapping formula. In accordance with one or more preferred implementations, an angle $a_2$ may be determined as an angle other than the one illustrated in FIG. 9B, but still based on the distance $d_2$. In accordance with one or more preferred implementations, a distance $d_2$ from a centerline of a camera's field of view is utilized to determine an angle $a_2$. For example, distances values for distance $d_2$ may be mapped to angle values for angle $a_2$ based on a total angular field of view of the camera.

Additionally, in accordance with one or more preferred implementations, a size of a detected object (e.g., a detected person) or a size of a determined bounding box for a detected object is utilized to estimate a distance of the object, and the estimated distance is utilized in combination with the position of the detected object or determined bounding box in the camera's field of view to determine an angle $a_2$.

In accordance with one or more preferred implementations, a size of a detected object (e.g. a detected person) or a size of a determined bounding box for a detected object is utilized to estimate a distance $d_3$ of the object, and the estimated distance $d_3$ is utilized in combination with the distance $d_2$ to determine an angle $a_2$ representing a determined angle with respect to a centerline extending from the camera for a hypothetical aerial view of the object within the environment captured in the camera's field of view. In accordance with one or more preferred implementations, this angle $a_2$ may be compared to the angle a determined for an object based on radar data.

In accordance with one or more preferred implementations, a size of a detected object (e.g., a detected person) or a size of a determined bounding box for a detected object is utilized to estimate a distance $d_3$ of the object, and the estimated distance $d_3$ is utilized in combination with the distance $d_2$ to determine a position of the object in a coordinate system, which may be compared to coordinates for a position of an object determined based on radar data.

In embodiments, the objects detected within the location data (e.g., object 902 and object 904) may be determined to correspond to the objects with the objects detected within the image data (e.g., object 910 and object 912). Techniques for making such a determination are described in greater detail with respect to a fusion component for correlating objects detected by a location sensor (e.g., radar data) to objects depicted within image data. In some embodiments, the angle $a_1$ as determined for object 902 in the location data may be compared to the angle $a_2$ as determined for object 910 in image data in order to determine that object 902 corresponds to object 910.

In some cases, one or more machine learning models may be used to correlate one or more objects as determined within the location data to one or more objects as determined within the image data. In these cases, the respective position of the objects may be determined with respect to time in order to more correctly correlate those objects. In some embodiments, attributes of one or more objects may also be used by the machine learning model to help correlate those objects. For example, a size of a bounding box (e.g., as identified by a diagonal for the bounding box) for a first object detected within the image data may be used to calculate a likelihood of that object corresponding to a second object as detected within the location data. This likelihood may be taken into account when correlating the objects.

Figure 9C:
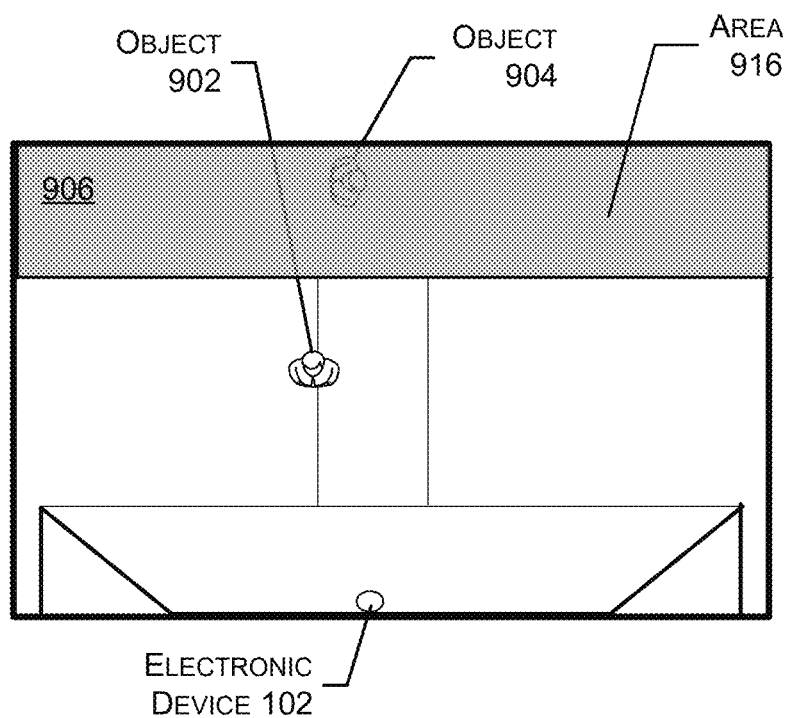
FIG. 9C illustrates techniques for determining if one or more objects are located in an area associated with a privacy screen, according to various examples of the present disclosure.

FIG. 9C illustrates techniques for determining if one or more objects are located in an area associated with a privacy screen, according to various examples of the present disclosure. As noted above, position data may be determined for a number of objects detected within a physical area that includes an electronic device. For example, location data may be determined for each of objects 902 and 904 within such an area (e.g., location representation 906).

As noted elsewhere, information may be maintained (e.g., by the electronic device 102) about one or more areas to be associated with a privacy screen. For example, an area associated with a privacy screen may be indicated via map data that is stored by the electronic device 102. In some cases, such an area may be represented as a number of boundary lines/points stored in relation to the map data (e.g., map data 227).

In some embodiments, information about a location of the one or more objects (e.g., 902 and 904) may be determined in relation to the electronic device. For example, radar data may be used to identify a distance and angle associated with each of the objects 902 and 904 with respect to the electronic device 102. Once the location of the objects have been determined, a determination may be made as to whether the respective locations for each of those objects are within the area 916 associated with the privacy zone. In the depicted example, object 904 is determined to be within the area 916 whereas object 902 is determined to be outside of the area 916. Accordingly, in the depicted example, object 904 will be obfuscated along with the content of the area 916 whereas object 902 should remain unobfuscated.

Figure 9D:
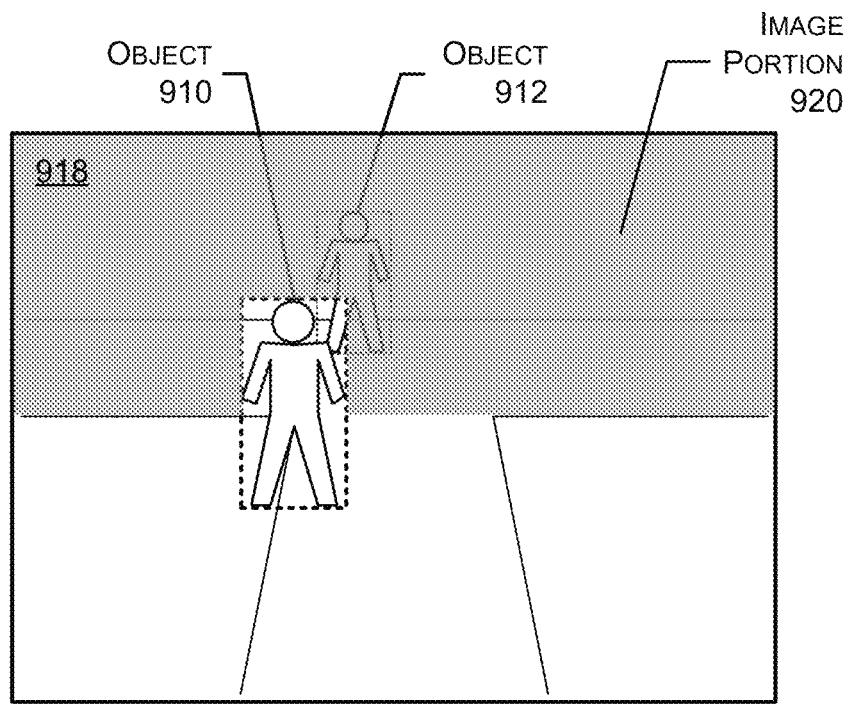
FIG. 9D illustrates techniques for selectively obfuscating portions of an image that correspond to a privacy screen, according to various examples of the present disclosure.

FIG. 9D illustrates techniques for selectively obfuscating portions of an image that correspond to a privacy screen, according to various examples of the present disclosure. In embodiments, raw image data is obtained from a camera included in an electronic device. one or more obfuscation techniques are applied to at least a portion of that raw image data in order to generate an obfuscated image data 918. In some embodiments, the portion of the image data to be obfuscated is a portion 920 of the image associated with a privacy screen.

Following from FIG. 9C above, a determination may be made that object 912 (corresponding to object 904 above) will be obfuscated along with the content of the area 916 whereas object 910 (corresponding to object 902 above) should remain unobfuscated. In such a scenario, a portion of the image data that corresponds to the object 910 is identified within the image data. In some cases, such a portion may be indicated via one or more boundaries to be associated with the object 910. For example, the portion of the image associated with the object 910 might be a bounding box generated for the object 910. Once the portion of the image data associated with the object 910 has been identified, the one or more obfuscation techniques may be applied to portions of the image data that are associated with a privacy zone except for those portions that overlap with the portion of the image associated with the object 910.

In some embodiments, the obfuscation techniques may continue to be applied to the image data as it is collected. In such cases, the object 910 may continue to remain unobfuscated as it moves around within the image data. In some cases, the object 910 may continue to remain unobfuscated even if that object enters a privacy zone. For example, if a video depicts a person exiting a privacy zone (e.g., coming onto a property) but then that person later reenters the privacy zone, the person may continue to remain unobfuscated even while in the privacy zone. In some cases, streaming of a video may be delayed, such that an electronic device maintains a buffer before providing image data. In such cases, the electronic device may apply the obfuscation techniques at the end of the buffer (e.g., just before the video is streamed) providing the ability to retroactively prevent obfuscation of an object which exits a privacy zone at a point in time before the object has exited the privacy zone. In embodiments in which the remote server receives raw image data from the electronic device, it should be noted that the obfuscated image data may be maintained separately from the raw image data, allowing an unobfuscated version of the image data to be viewed at a later date.

Figure 10:
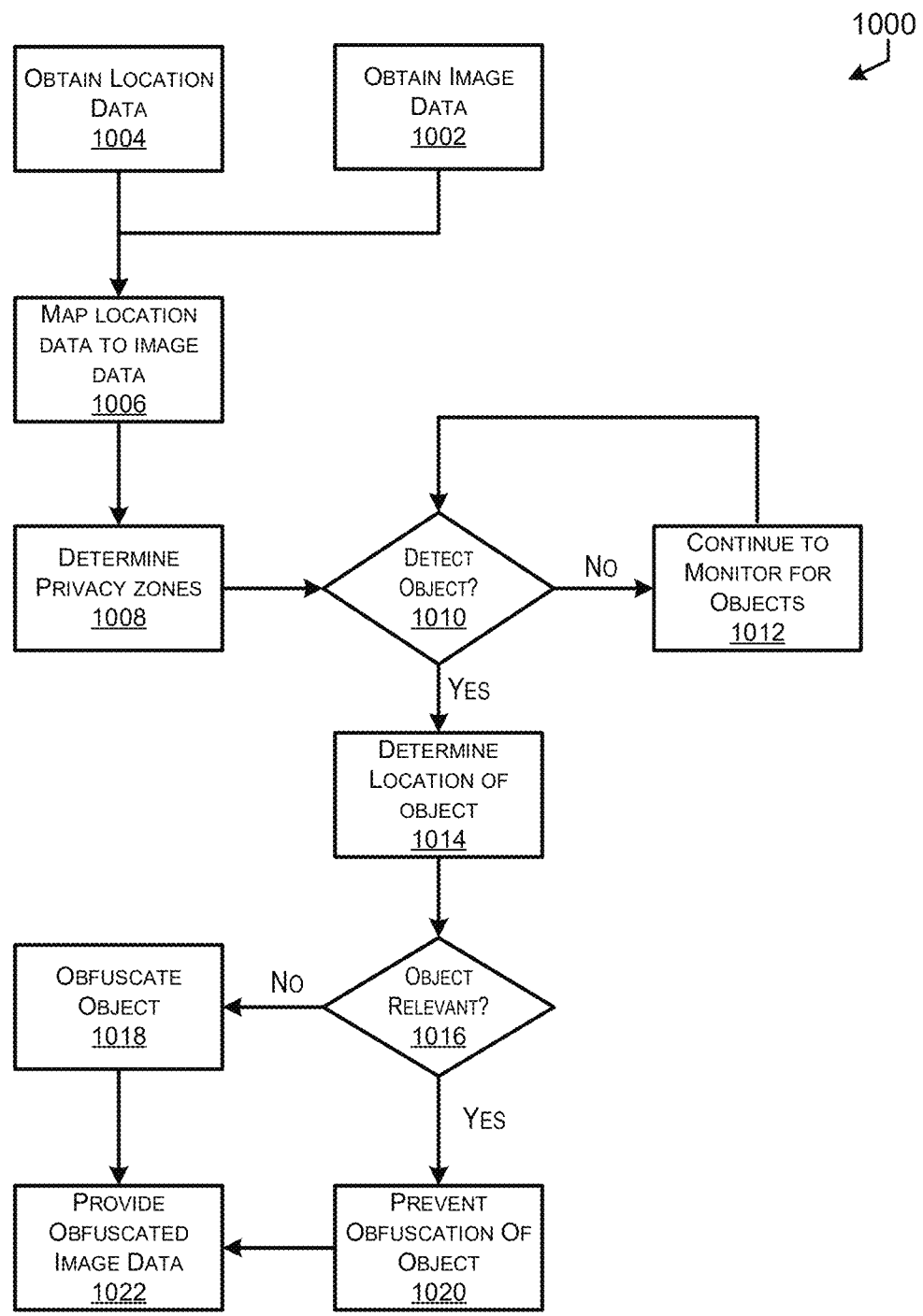
FIG. 10 a flow chart illustrating a process for implementing privacy screens in images obtained from an electronic device in accordance with at least some embodiments.

FIG. 10 a flow chart illustrating a process for implementing privacy screens in images obtained from an electronic device in accordance with at least some embodiments. The process 1000 may be performed by any suitable computing component (either software or hardware), such as, but not limited to, the electronic device 102 and/or the remote system 106 as described in relation to FIG. 1 above.

At 1002, the process 1000 may involve obtaining image data from a camera included in an electronic device. In embodiments, this may involve activating one or more cameras included in the electronic device to generate image data. The image data represents images captured with a field of view (FOV) of the camera. In some cases, the image data is a still image that is captured at a single point in time. In other cases, the image data is a continuous stream of images (e.g., a video) captured over a period of time. In some cases, image data may be captured by the camera device upon detecting an event (e.g., a motion detection event, etc.).

In some embodiments, the process 1000 may involve obtaining location data at 1004. As noted elsewhere, location data may include any suitable indication of a location associated with the electronic devices and/or one or more objects in an environment in which the electronic device is located. In some cases, the location data may include map data that is stored by the electronic device. However, it should be noted that not all embodiments of the disclosure will use location data as described herein.

In embodiments in which location data is obtained, the process 1000 may involve correlating one or more points in the location data to one or more points in the image data at 1006. As noted elsewhere, the electronic device may maintain a mapping between location data and image data. For example, particular points within the image data may be correlated to a location within a physical area in which the electronic device is located.

At 1008, the process 1000 may involve determining one or more privacy zones. In some embodiments, privacy zones may be indicated via one or more boundary lines/points representing locations within image data. In some embodiments, privacy zone data may be indicated via one or more boundary lines/points representing locations within a physical area that includes the electronic device. In these embodiments, such locations within the physical area may be correlated to locations within the image data.

The electronic device may be configured to monitor for the presence of moving objects. For example, as noted elsewhere, the electronic device may include one or more motion sensors capable of detecting a moving object (e.g., via a detected change in temperature, etc.). In this example, the electronic device may receive a signal that is generated by the motion sensor when a moving object is within range of that motion sensor.

At 1010, the process 1000 may involve making a determination as to whether one or more moving objects has been detected based on received motion sensor data. In some cases, upon receiving a signal from a motion sensor included in the electronic device, the electronic device may activate (e.g., wake up) a camera to begin obtaining image data. The electronic device may then use one or more computer vision techniques to process the received image data in order to determine if the image data includes an object. It should be noted that while an example is given in which the camera is activated upon detecting motion, in some embodiments, the camera may continuously capture image data regardless of whether motion is detected. Upon making a determination that no moving objects have been detected (e.g., "No" at 1010), the process 1000 may involve continuing to monitor for objects at 1012.

Upon making a determination that one or more moving objects have been detected (e.g., "Yes" at 1010), the process 1000 may involve determining a location of the one or more object at 1014.

In some embodiments, determining a location of an object may involve determining a physical location of the object with respect to the electronic device, such as a location within a physical area in which the electronic device is located. As noted elsewhere, this may involve obtaining location data generated by a location sensor (e.g., radar data received from a radar included in the electronic device) in order to determine an angle and distance of the object from the electronic device. In these embodiments, a determination can be made as to whether the physical location of the object falls within, or outside of, one or more privacy zone.

In some embodiments, determining a location of an object may involve determining a location of the object within the image data. In some of these embodiments, such a location may be represented by the locations of bounds for a bounding box associated with the object within the image data. In some of these embodiments, such a location may be a location of the center of the object as detected within the image data.

At 1016, the process 1000 may involve making a determination as to whether the object is relevant to a potential event. In some cases, such a determination may be made based on a determined type or category associated with the detected object. For example, as noted elsewhere, one or more computer vision techniques may be used to identify objects within the image data. In this example, in addition to identifying objects within the image data, such computer vision techniques may be further configured to the type or category of the object as well as a location of the respective object.

In embodiments, a relevance of the object may be determined based on the determined type or category of object. For example, certain objects may be determined to be relevant whereas other objects are not. In this example, objects may be determined to be relevant if the object is a person, animal, or automobile.

In embodiments, a relevance of the object may be determined based on whether the object is located inside of, or outside of, a privacy zone. In some cases, an object may be determined to be inside of a privacy zone if a determined physical location of that object falls within a physical area that is indicated as a privacy zone (e.g., as determined at 1008). In some embodiments, an object is determined to be within a privacy zone if some threshold portion of the object detected within the image data falls outside of a privacy zone. For example, if an object is detected within an image and at least 20% (an example threshold portion) of that object falls outside of the area associated with a privacy zone in the image data, then the object may be determined to fall outside of the privacy zone, and may therefor be determined to be relevant.

Upon making a determination that the one or more objects are not relevant (e.g., "No" at 1016), the process 1000 may involve obfuscating the object at 1018. In these embodiments, one or more obfuscation techniques are applied to all of a portion of the image that is associated with the privacy zone. In other words, all of the image data that falls within the bounds of the privacy zone will have the one or more obfuscation techniques applied.

Upon making a determination that the one or more objects are relevant (e.g., "Yes" at 1016), the process 1000 may involve preventing obfuscation of the object at 1020. In these embodiments, one or more obfuscation techniques are applied to the portion of the image associated with the privacy zone except for any portion of the image data that also corresponds to the detected object. For example, when applying the one or more obfuscation techniques to the portion of the image data associated with a privacy zone, those obfuscation techniques would not be applied to a portion of the image that walls within a bounding box for the object.

At 1022, the process 1000 may involve providing the obfuscated image data to at least one second electronic device. For example, the obfuscated image data may be provided by the electronic device to a remote system (e.g., remote system 106 as described in FIG. 1). In another example, the obfuscated image data may be provided by the electronic device to a user device (e.g., user device 108 as described in FIG. 1).

Figure 11:
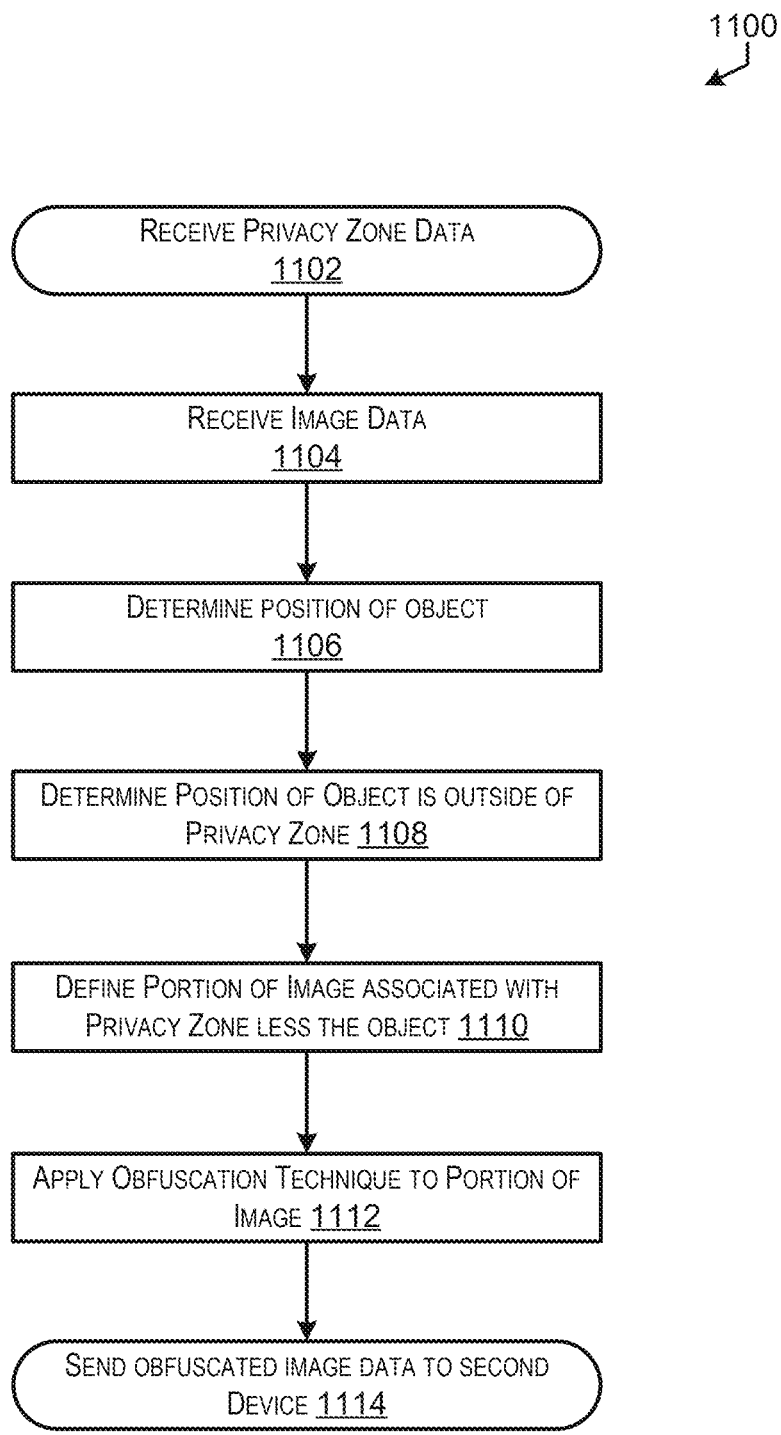
FIG. 11 depicts a flow diagram illustrating an exemplary process for generating obfuscated image data on an electronic device in accordance with at least some embodiments.

FIG. 11 depicts a flow diagram illustrating an exemplary process for generating obfuscated image data on an electronic device in accordance with at least some embodiments. The process 1100 may be performed by an electronic device, such as the electronic device 102 as described in relation to FIG. 1 above. The electronic device may include one or more camera as well as one or more motion sensors and/or radar sensors. In some embodiments, the electronic device is an audio/video device mounted on a structure (e.g., a building). In some cases, the electronic device may be in further communication with a remote system.

At 1102, the process 1100 may involve receiving first data that includes an indication of one or more privacy zones. In some embodiments, the first data defining the privacy zone (e.g., information about one or more bounds of the privacy zone) is received from a user device associated with a user of the electronic device. In some embodiments, the user device includes a touch-screen display, and the first data is generated by the user device based on user input provided via the touch-screen display. In these embodiments, the user input comprises touch data related to a representation of the image data that is displayed on the touch-screen display of the user device.

At 1104, the process 1100 may involve receiving image data generated by a camera of the electronic device. In some embodiments, the image data may comprise a still image captured at a single point in time. In some embodiments, the image data may comprise a stream of images (e.g., a video) captured over a period of time.

At 1106, the process 1100 may involve determining a location of one or more objects detected within the image data. In embodiments, the position of the object detected within the image data comprises a location of the object within a physical area depicted within the image data. In some embodiments, the position of the object detected within the image data comprises coordinates of the object as depicted within the image data. In some embodiments, the position of an object comprises a center point for the object. In some embodiments, the position of an object comprises a point on a bounding box associated with the object.

At 1108, the process 1100 may involve determining, based on the indication of one or more privacy zones and the location of an object, whether the object is positioned within a privacy zone. In some embodiments, determining that the object is outside of the first area associated with the privacy zone comprises determining that a threshold amount of the second area associated with the object lies outside of the first area.

At 1110, the process 1100 may involve defining a portion of the image data that corresponds to privacy zone less an area associated with the object. In other words, an area may be defined that includes all of the portion of the image data associated with the privacy zone except for the portion of the image that represents the object.

At 1112, the process 1100 may involve applying an obfuscation technique to the portion of the image data. In embodiments, the at least one obfuscation technique comprises an image blurring technique. Note that this is done while leaving unobfuscated a second portion of the image data that corresponds to the object. In embodiments, the second area associated with the object comprises a bounding box for the object within the image data.

At 1114, the process 1100 may involve sending the obfuscated image data to at least one second electronic device. In embodiments, the obfuscated image data is provided to a user device associated with a user of the electronic device.

Figure 12:
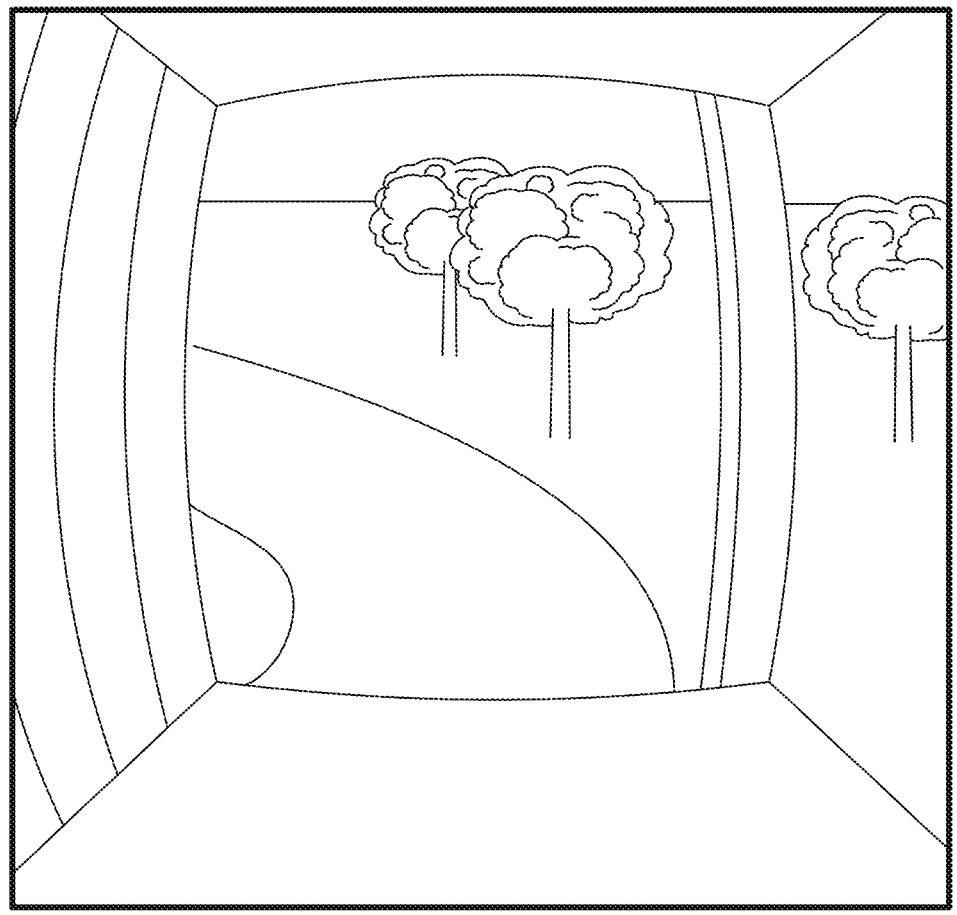
FIG. 12 illustrates an example of an image that may be captured by a camera device and displayed on a screen of a user device.
Figure 13:
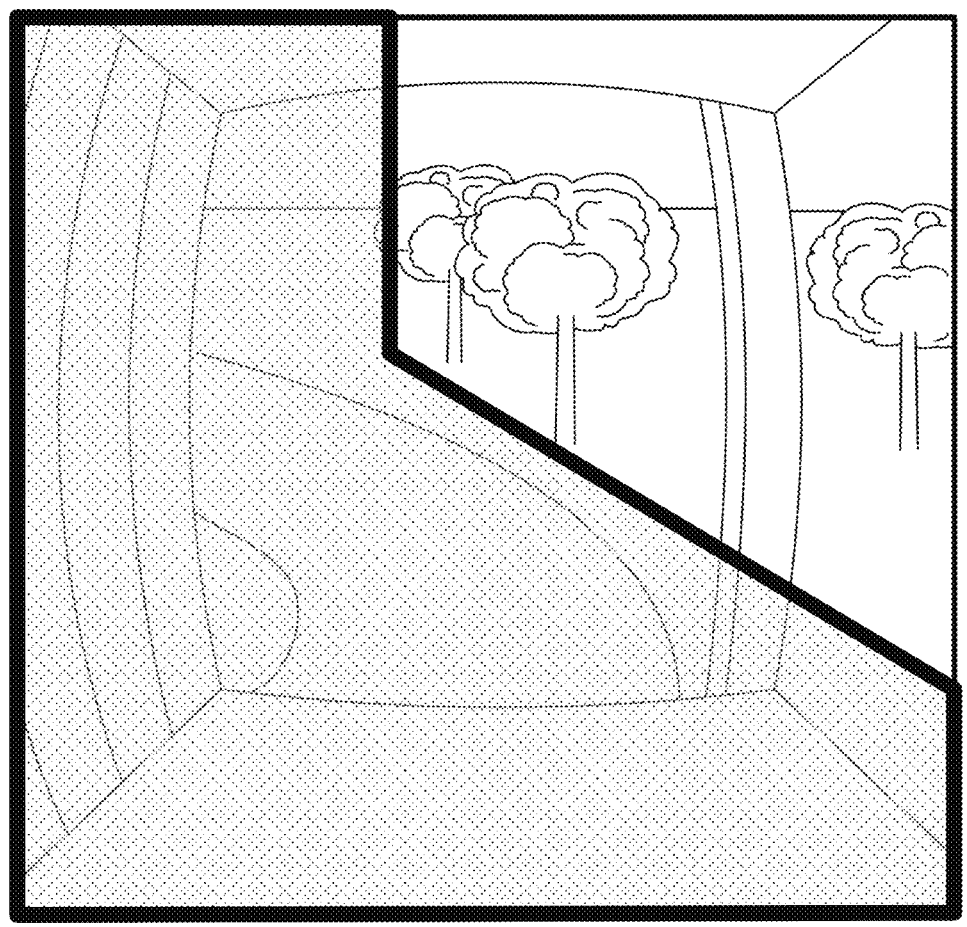
FIG. 13 illustrates an example of a user-provided motion zone as depicted on a captured image.

In accordance with one or more implementations, a system utilizes motion zones or detection zones to identify one or more areas of a camera's field of view within which a user desires to monitor for motion or detect objects. For example, an app loaded on a user device may present to a user an interface displaying a snapshot or video from a camera device, and allow a user to draw or otherwise indicate a motion zone or detection zone to use in determining whether to send alerts to the user, as illustrated in FIGS. 12-13. Particularly, FIG. 12 illustrates an example of an image that may be captured by a camera device and displayed on a screen of a user device. The app may be used to identify and save one or more motion zones or detection zones. FIG. 13 illustrates an example of a user-provided motion zone as depicted on a captured image. In accordance with one or more implementations, for each motion zone or detection zone, a user may be able to specify one or more object types for which a notification may be desired, e.g. a person, a vehicle, etc.

The user device sends an indication of the motion zone or detection zone to a remote system. In accordance with one or more implementations in which motion detection or object detection is performed at a camera device, the remote system sends an indication of the motion zone or detection zone to a camera device. In accordance with one or more implementations in which motion detection or object detection is performed at the remote system, the remote system may or may not send an indication of a defined motion zone or detection zone to a camera device.

Figure 14:
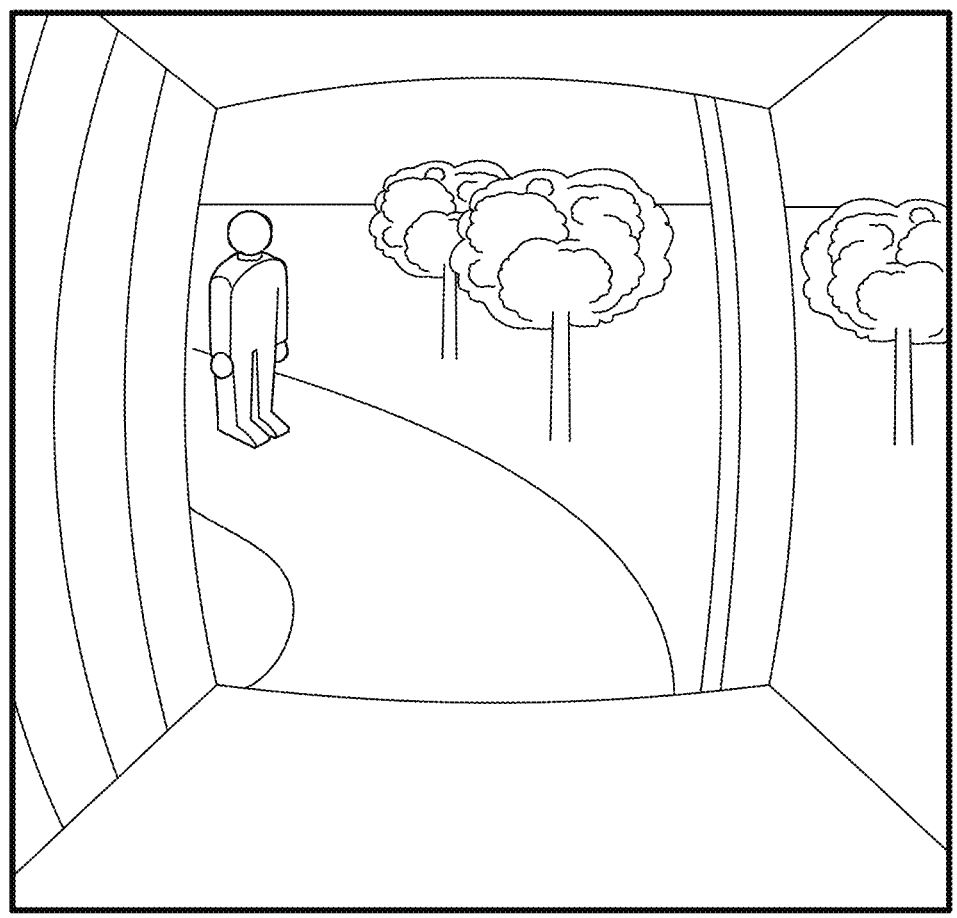
FIG. 14 illustrates exemplary image data representing a frame as generated by a camera in accordance with some embodiments.
Figure 15:
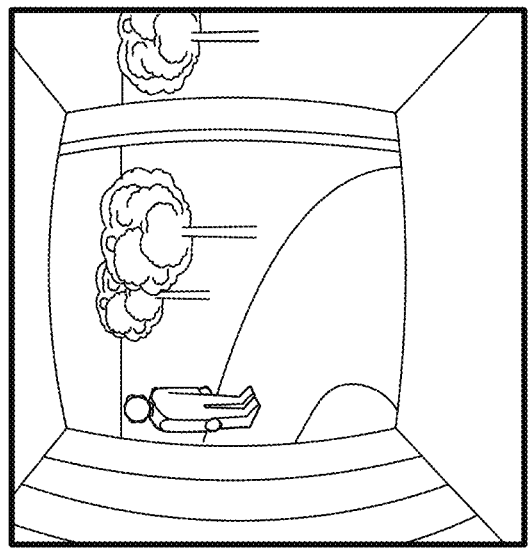
FIG. 15 illustrates a relationship between image data and a number of frame data corresponding to portions of the image data.
Figure 15:
Figure 16:
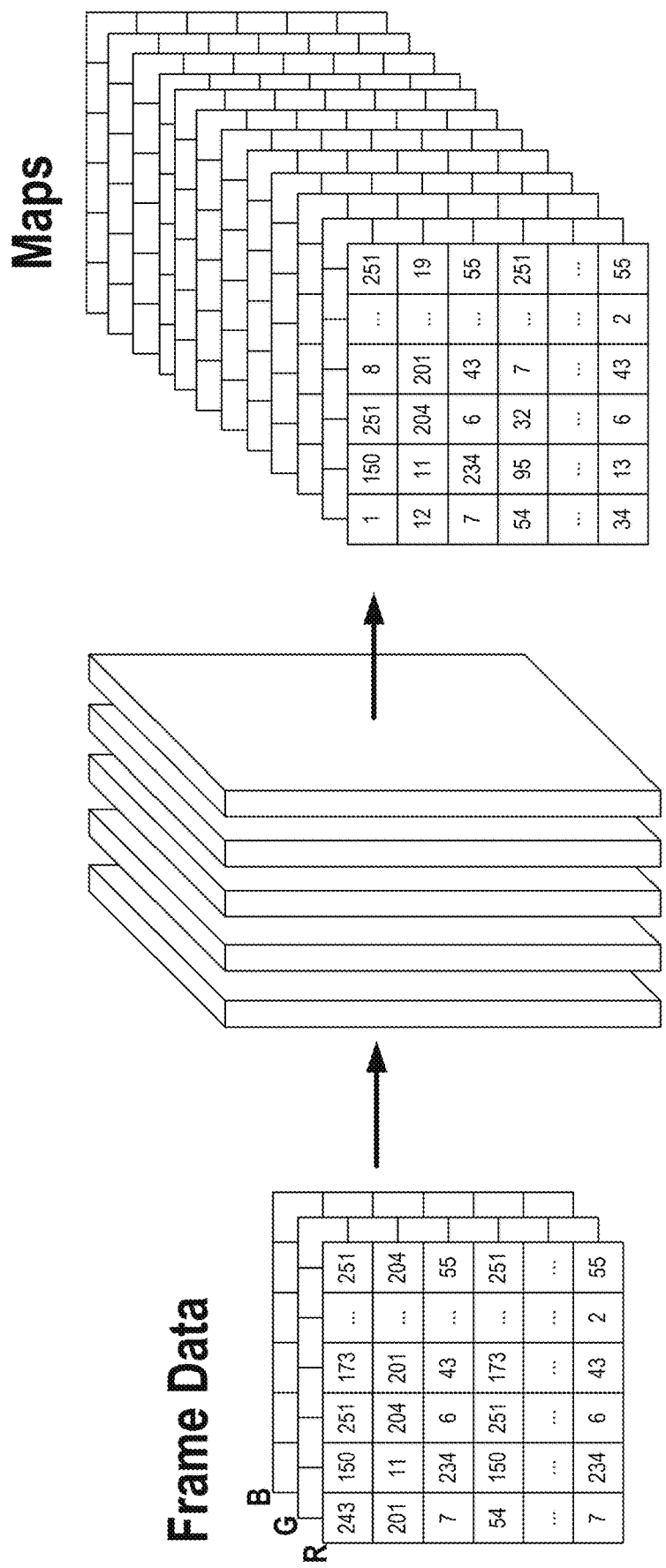
FIG. 16 illustrates the use of a machine learning model to map frame data as input to feature maps as output.
Figure 17:
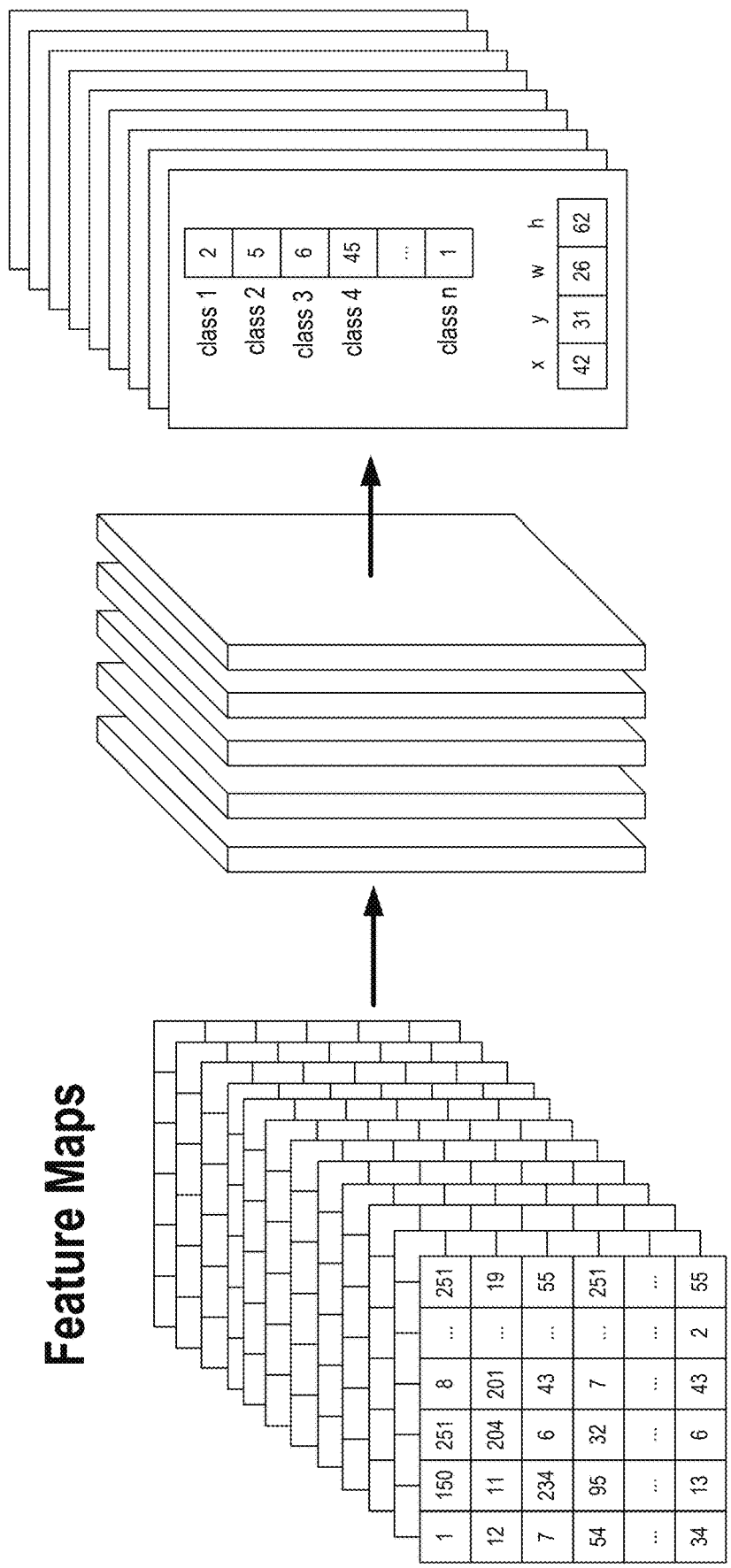
FIG. 17 illustrates the use of a machine learning model to map feature maps as input to classes as output.

FIG. 14 illustrates exemplary image data representing a frame as generated by a camera (e.g., a snapshot or a first frame of a video) in accordance with some embodiments. The system (e.g. either the camera device or the remote system) utilizes one or more machine learning models (e.g. one or more convolutional neural networks, visual transformers, recurrent neural networks, etc.) to process frame data, as illustrated in FIGS. 15-17. By way of example, FIG. 15 illustrates a relationship between image data and a number of frame data corresponding to portions of the image data. FIG. 16 illustrates the use of a machine learning model to map frame data as input to feature maps as output. FIG. 17 illustrates the use of a machine learning model to map feature maps as input to classes as output.

Figure 18:
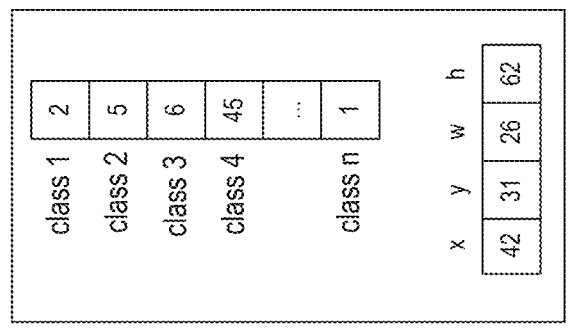
FIG. 18 illustrates a bounding box for a detected person determined to be associated with a person class using one or more convolutional neural networks and a single shot detector approach.
Figure 18:
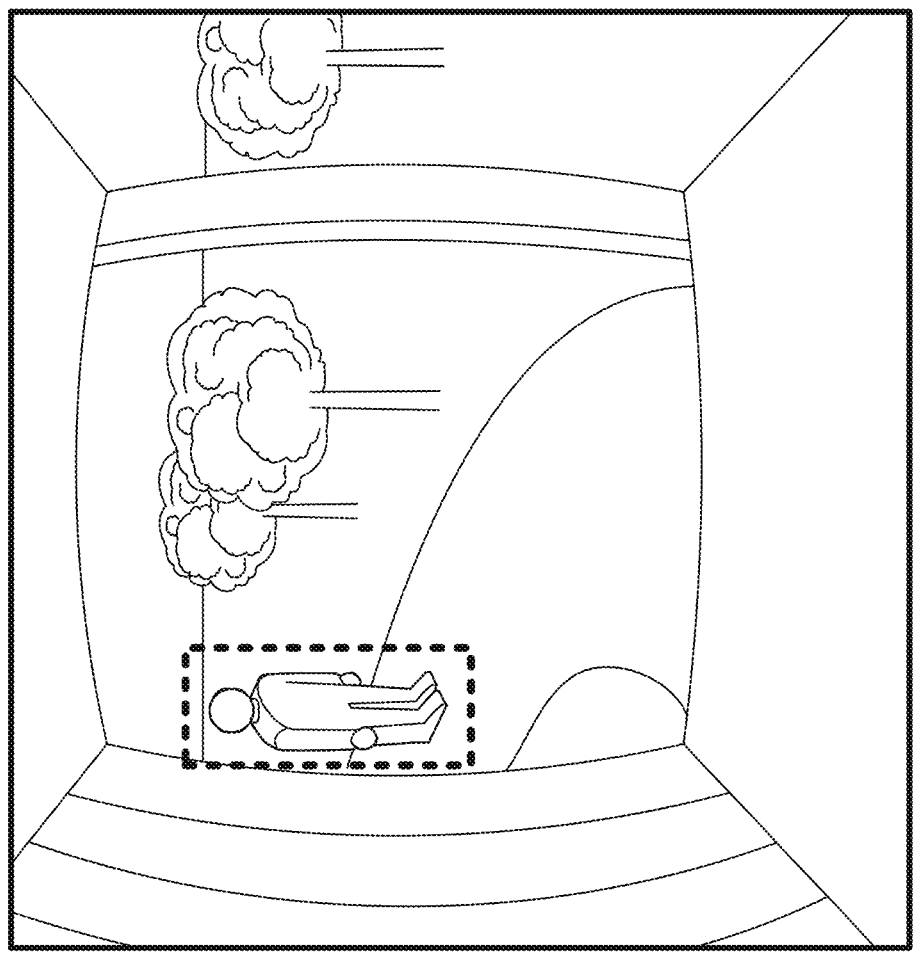

The system detects one or more objects (e.g., using an objection detection approach such as a single shot object detection approach or a segmentation and classification object detection approach) a bounding box, pixel locations, or other image location corresponding to a detected object (e.g., a person or vehicle). For example, FIG. 18 illustrates a bounding box for a detected person determined to be associated with a person class using one or more convolutional neural networks and a single shot detector approach. The portions of image data analyzed may be determined or bounded based on a defined motion zone or detection zone.

Figure 19:
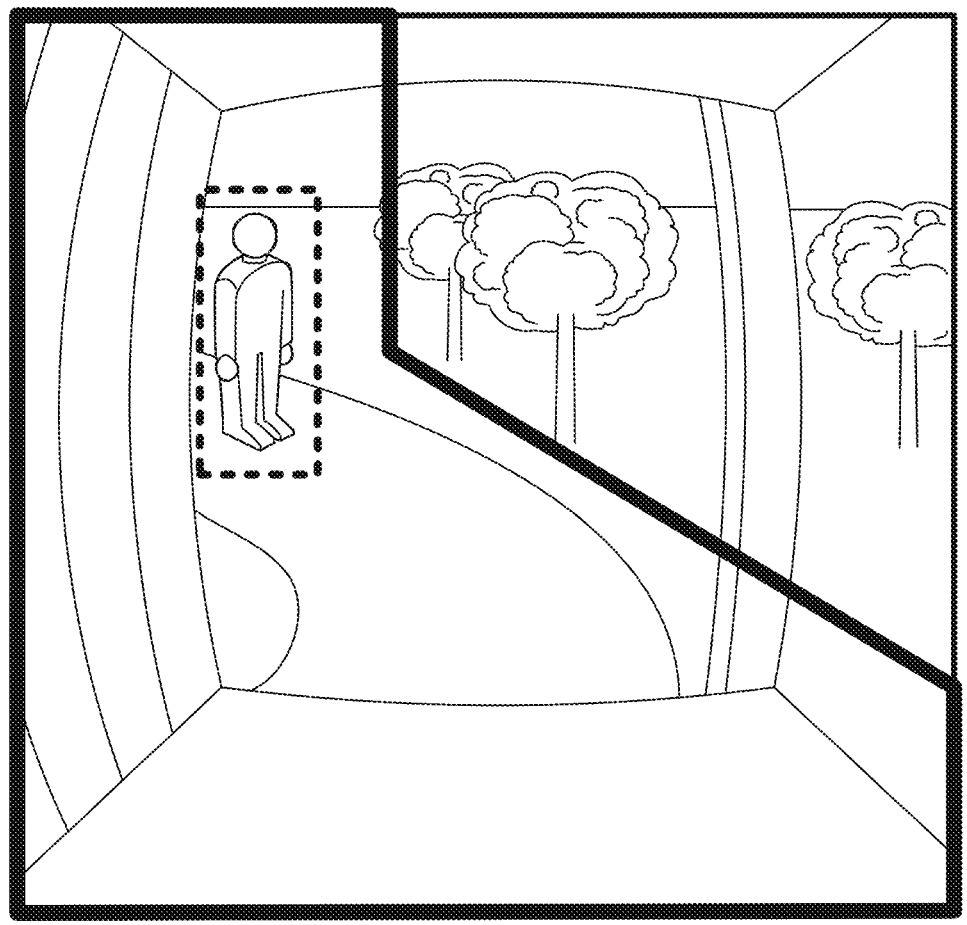
FIG. 19 illustrates an object detected within a motion detection zone in accordance with at least some embodiments.

In some implementations (e.g. implementations in which image data for portions of a frame outside of a motion detection zone are analyzed or processed), a system determines, using stored data indicating a motion zone or detection zone, whether a detected object is located within, or mostly located within, a motion zone (e.g. using an intersection over union threshold or a percentage threshold, etc.), e.g. as fancifully illustrated in FIG. 19.

In accordance with one or more implementations, a system applies a blur effect or other obfuscation effect to portions of an image that have not been determined to correspond to a detected object. In accordance with one or more implementations, a system only analyzes image data to detect objects within a portion of a frame or image that corresponds to a defined motion zone or detection zone. In accordance with one or more implementations, a system analyzes image data to detect objects within an entire frame or image, but then determines using one or more image or pixel locations for a detected object whether the detected object is located within or substantially located within (e.g. above a threshold) a defined motion zone or detection zone.

Figure 20:
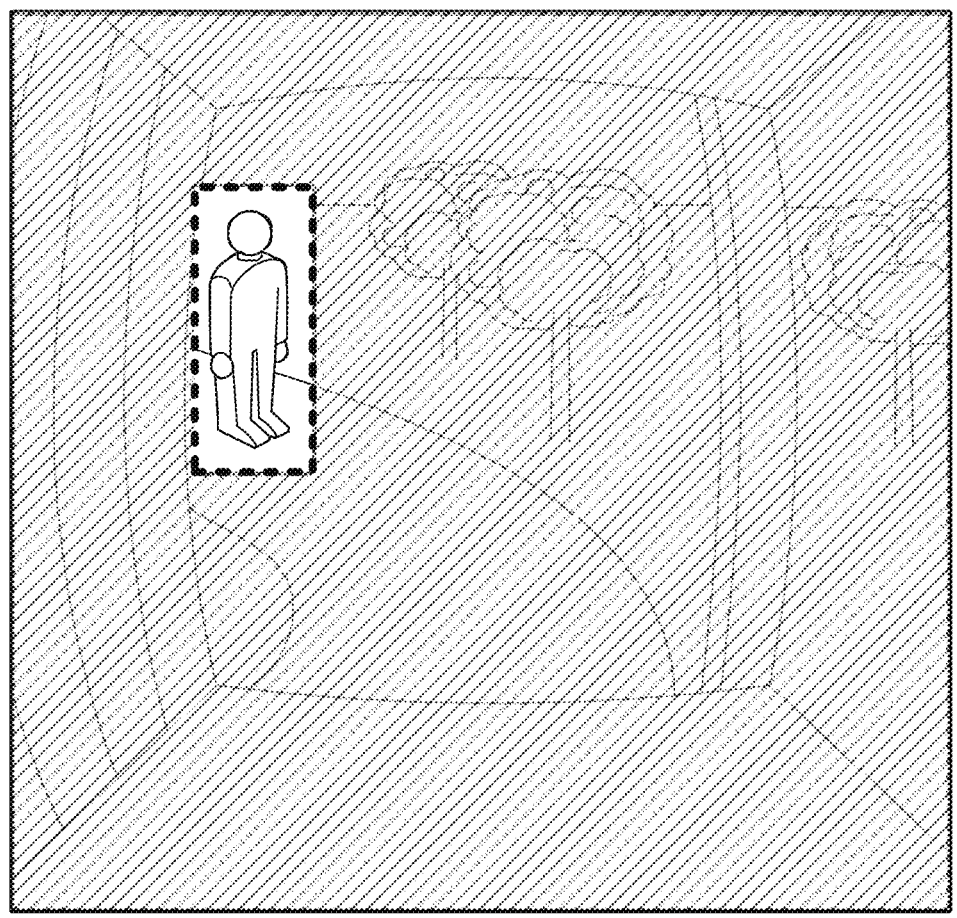
FIG. 20 illustrates a bounding box identified in relation to an object detected within an image.
Figure 21:
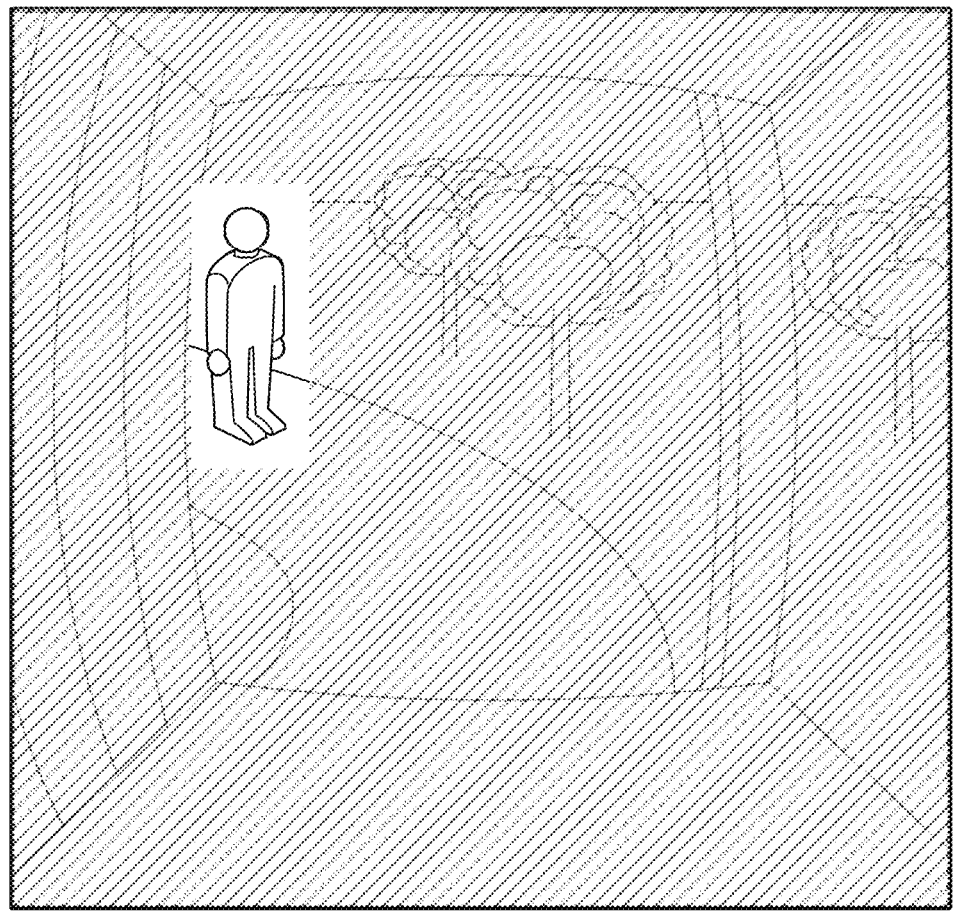
FIG. 21 illustrates an obfuscation effect applied to a portion of the image other than the object.

In accordance with one or more implementations, if a detected object is determined to be located within or substantially within a motion zone or detection zone, then blurring or obfuscation is not applied to image or pixel locations corresponding to the detected object, as fancifully illustrated in FIGS. 19-21. For example, FIG. 19 illustrates an object detected within a motion detection zone in accordance with at least some embodiments. FIG. 20 illustrates a bounding box identified in relation to an object detected within an image. FIG. 21 illustrates an obfuscation effect applied to a portion of the image other than the object.

In accordance with one or more implementations, if a detected object is determined to be located substantially within a motion zone or detection zone, then blurring or obfuscation is not applied to image or pixel locations corresponding to the detected object that are within the motion zone or detection zone, but blurring may or may not be applied to image or pixel locations corresponding to the detected object that are outside of the motion or detection zone, depending on the implementation.

In accordance with one or more implementations, an approach involves receiving first image data generated by a camera of an electronic device, the first image data representing a first frame of a video, determining, based on first object detection data generated using the first image data, a first set of pixel locations corresponding to a detected object, accessing stored detection zone data indicating a defined detection zone, determining, based on the stored detection zone data and the first set of pixel locations, a second set of pixel locations comprising pixel locations of the first set located within the detection zone, generating, based on the first image data, second image data representing a blurred version of the first frame, wherein the blurred version of the first frame does not include blurring for the second set of pixel locations. In accordance with one or more implementations, an approach involves receiving first image data generated by a camera of an electronic device, the first image data representing a first frame of a video, determining, based on first object detection data generated using the first image data, a first set of pixel locations corresponding to a detected object, accessing stored detection zone data indicating a defined detection zone, determining, based on the stored detection zone data and the first set of pixel locations, a second set of pixel locations within the defined detection zone that are not in the first set of pixel locations, generating, based on the first image data, second image data representing a blurred version of the first frame, wherein the blurred version of the first frame includes blurring for the second set of pixel locations.

In accordance with one or more preferred implementations, blurring of video may be performed at a camera device or at a remote system (e.g. in the cloud). Blurring may be performed at various stages in an image processing pipeline, or at various stages in the cloud. For example, blurring may be performed in the cloud for all video received from a camera device, or may be performed on-demand only for video that a user requests to view or share.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
a camera;
one or more processors; and
one or more computer-readable media storing instructions that, when executed by the one or more processors, cause the electronic device to perform operations comprising:
receiving, from the camera, first image data;
correlating the first image data to a physical space that is within a field of view (FOV) of the camera;
receiving first data defining a privacy zone, the privacy zone corresponding to a portion of the first image data;
determining presence of an object within the physical space;
determining a bounding box associated with the object, wherein a first portion of the bounding box is within the privacy zone and a second portion of the bounding box is outside the privacy zone;
determining, based on relative sizes of the first portion of the bounding box and the second portion of the bounding box, that the object is outside of the privacy zone;
generating second image data by applying, based on determining that the object is outside of the privacy zone, at least one obfuscation technique to a first portion of the image data that corresponds to the privacy zone while leaving a second portion of the image data that represents the detected object unobfuscated; and
sending the second image data to at least one second electronic device.

2. The electronic device of claim 1, wherein the electronic device further comprises one or more motion sensors, and the image data is received in response to activating the one or more cameras based on a signal received from the one or more motion sensors.

3. The electronic device of claim 1, wherein the electronic device comprises a video doorbell device.

4. A method comprising:
receiving first image data generated by a camera of an electronic device, the first image data representing a first frame of a video;
detecting presence of an object in the first image data;
determining, based on the first image data, a bounding box corresponding to the object;
accessing stored privacy zone data indicating a defined privacy zone;
determining, based on a first size of a first portion of the bounding box and a second size of a second portion of the bounding box, that the object is outside the privacy zone; and
generating, based on the first image data and the object being outside the privacy zone, second image data representing a blurred version of the first frame, wherein the blurred version of the first frame does not include blurring of the object.

5. The method of claim 4, wherein the bounding box data indicates an x position of a first corner, a y position of a first corner, a width, and a height.

6. The method of claim 4, wherein the first data size is larger than the second size and the second portion of the bounding box is outside the privacy zone.

7. The method of claim 4, wherein the first portion of the bounding box is located within the privacy zone and the second portion of the bounding box is located outside of the privacy zone, and the second size exceeds a threshold.

8. The method of claim 7, wherein the second size is smaller than the first size.

9. The method of claim 4, wherein the first image data corresponds to a physical space that is within a field of view (FOV) of the camera, the method further comprising correlating the first image data to the physical space.

10. The method of claim 9, further comprising:
determining, using a radar of the camera, a first distance between the camera and the object in the physical space;
determining, an angle between the object and the camera;
determining, based on the first distance and the angle, a location of the object in the physical space; and
wherein determining that the object is outside of the privacy zone is further based on the location of the object in the physical space.

11. A method comprising:
receiving first image data generated by a camera of an electronic device, the first image data representing a physical space;
determining presence of an object in the physical space;
determining, based on the first image data, a bounding box associated with the object;
accessing stored privacy zone data indicating a defined privacy zone within the first image data;
determining that a first portion of the bounding box is within the privacy zone and a second portion of the bounding box is outside the privacy zone;
determining, based on the first portion and the second portions of the bound box, that the object is located outside the privacy zone; and
generating, based on the first image data and the object being outside the privacy zone, second image data, wherein in the second image data, the object is unblurred and a remaining portion of the privacy zone is blurred.

12. The method of claim 11, wherein the second image data includes unblurring for all pixel locations outside of the defined detection privacy zone.

13. The method of claim 11, wherein the bounding box indicates an x position of a first corner, a y position of a first corner, a width, and a height.

14. The method of claim 11, wherein a size of the second portion of the bounding box exceeds a threshold size.

15. The method of claim 11, wherein presence of the object in the physical space further comprising: determining, using a radar of the electronic device, a first distance between the camera and the object in the physical space; determining, an angle between the object and the camera; and determining, based on the first distance and the angle, a location of the object in the physical space.

16. The method of claim 15, wherein determining that the object is outside the privacy zone is further based on the location of the object in the physical space.

17. A device comprising:
a camera;
a radar unit;
one or more processors; and
memory including one or more instructions that when executed by the one or more processors cause the one or more processors to:
  receive first image data generated by the camera, the first image data representing a first frame of a video;
  detect presence of an object in the first image data;
  determine, based on the first image data, a bounding box corresponding to the object;
  access stored privacy zone data indicating a defined privacy zone;
  determine, based on a first size of a first portion of the bounding box and a second size of a second portion of the bounding box, that the object is outside the privacy zone; and
  generate, based on the first image data and the object being outside the privacy zone, second image data representing a blurred version of the first frame, wherein the blurred version of the first frame does not include blurring of the object.

18. The device of claim 17, wherein the second size is smaller than the first size.

19. The device of claim 18, wherein the first portion of the bounding box is within the privacy zone and the second portion of the bounding box is outside the privacy zone and the second size exceeds a threshold size.

* * * * *